US008041767B2

(12) United States Patent  (10) Patent No.: US 8,041,767 B2
Tamaru et al.  (45) Date of Patent: Oct. 18, 2011

(54) CONFERENCE TERMINAL APPARATUS IN ELECTRONIC CONFERENCE SYSTEM, ELECTRONIC CONFERENCE SYSTEM, AND DISPLAY IMAGE CONTROL METHOD

(75) Inventors: Eriko Tamaru, Yokohama (JP); Kazunori Horikiri, Tokyo (JP); Yoshiki Watanabe, Tokyo (JP); Masatomi Inagaki, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 869 days.

(21) Appl. No.: 11/259,667

(22) Filed: Oct. 26, 2005

(65) Prior Publication Data

US 2007/0035614 A1    Feb. 15, 2007

(30) Foreign Application Priority Data

Jun. 24, 2005  (JP) ................... 2005-185090

(51) Int. Cl.
*G06F 15/16* (2006.01)
(52) U.S. Cl. ....................... 709/205; 709/204
(58) Field of Classification Search .......... 709/204, 709/205; 345/1.1–3.4
See application file for complete search history.

(56) References Cited

U.S. PATENT DOCUMENTS

| 5,745,380 | A  | * | 4/1998 | Sandvoss et al. | 379/90.01 |
| 5,838,318 | A  | * | 11/1998 | Porter et al. | 715/790 |
| 6,535,118 | B1 | * | 3/2003 | Takagi et al. | 340/501 |
| 7,028,269 | B1 | * | 4/2006 | Cohen-Solal et al. | 715/863 |
| 7,428,000 | B2 | * | 9/2008 | Cutler et al. | 348/14.11 |
| 2003/0052835 | A1 | * | 3/2003 | Krempl | 345/1.1 |
| 2003/0149724 | A1 | * | 8/2003 | Chang | 709/204 |
| 2004/0113935 | A1 | * | 6/2004 | O'Neal et al. | 345/732 |

FOREIGN PATENT DOCUMENTS

| JP | 11-177953 A | * | 2/1999 |
| JP | 11177953 | | 7/1999 |

OTHER PUBLICATIONS

Chiu et al., "Manipulating and Annotating Slides in a Multi-Display Environment", 2003, retrieved from http://www.idemployee.id.tue.nl/g.w.m.rauterberg/conferences/INTERACT2003/INTERACT2003-p583.pdf, on May 6, 2009.*
Korean Office Action dated Feb. 6, 2007, corresponding to Korean Application No. 10-2006-0015068, and English excerpt.

* cited by examiner

*Primary Examiner* — Joon H Hwang
*Assistant Examiner* — Thomas Lee, IV
(74) *Attorney, Agent, or Firm* — Gesmer Updegrove LLP

(57) ABSTRACT

A conference terminal apparatus is used by a speaker of an electronic conference for transmitting image information displayed on a screen and causing a remote conference terminal apparatus used by an audience to display the image information on a remote screen. In the conference terminal apparatus, a screen control part displays a plurality of image information items on the screen. A priority allocation part allocates to each of the displayed image information items priority for being displayed on the remote screen. An information transmission processing part transmits to the remote conference terminal apparatus the displayed image information items and the priority allocated to each of the image information items.

12 Claims, 14 Drawing Sheets

CONFERENCE TERMINAL APPARATUS IN ELECTRONIC CONFERENCE SYSTEM, ELECTRONIC CONFERENCE SYSTEM, AND DISPLAY IMAGE CONTROL METHOD

BACKGROUND OF THE INVENTION

1. Field of the Invention

The present invention relates to display image control for displaying plural image information items which are received by a computer on display screens managed by the computer, and more particularly to display image control in a case where the number of received image information items differs from the number of display screens managed by a computer.

2. Description of Related Art

An electronic conference system generally allows computers provided in conference rooms remote from each other to be connected to each other for transmitting and receiving real-time image information. The image information which is received is displayed on display screens, such as liquid crystal displays, which are managed by the computer in the conference rooms. In a case where a presenter performs presentation in a certain conference room, image information being displayed on the display screen in this conference room is sent to a computer located in another conference room and is displayed on the display screen of the computer. As such, a conference participant who is present in the conference room on the receiving side can confirm the contents of the presentation being performed in the remote conference room.

Further, if a presenter performs presentation while using plural display screens to display plural information items simultaneously, a conference participant in a remote conference room can confirm the contents of the presentation while viewing plural display screens in his/her own conference room. The use of multiple screens as described above enables a conference participant in a remote conference room to confirm a large amount of information simultaneously, so that he can easily understand the presentation.

Here, when the number of screens which are used in a conference room on the information transmitting side is the same as the number of screens which are used in a conference room on the information receiving side, no problems will arise, because the image information items on the displays screens on the transmitting side can be allocated directly to and displayed on the display screens on the receiving side.

However, when the number of screens which are used in a conference room on the information transmitting side differs from the number of screens which are used in a conference room on the information receiving side, and particularly when the number of screens which are used on the receiving side is less than that used on the transmitting side, it becomes impossible to simultaneously display on the display screens provided at the conference room on the receiving side all the image information items transmitted from the conference room on the transmitting side.

In order to overcome such a disadvantage, a viewer or audience in the conference room on the receiving side selects, among the image information items which are transmitted, a number of information items corresponding to the number of display screens in the conference room on the receiving side; i.e. the same number of information items as the number of display screens in the conference room on the receiving side. With this method, however, the viewer, having no criteria for selecting the image information item which the presenter would like the viewer to select, selects the image information item at his/her own discretion. Consequently, the image information item selected by the viewer is not necessarily the image information which the presenter would like the viewer to select.

In order to address the above problem, it may be the case that the presenter himself selects the image information item which the presenter would like the viewer to select. This method, however, raises the following problems. First, this method tends to confuse the presenter, because the presenter must select image information item while he or she is performing presentation. This problem becomes particularly serious when the presenter must select plural image information items. In addition, when plural conference rooms are provided on the receiving side, the presenter encounters difficulty in selecting the image information so as to satisfy the demands of the participants in all the conference rooms.

SUMMARY OF THE INVENTION

According to one aspect of the present invention, there is provided a conference terminal apparatus used by a speaker of an electronic conference for transmitting image information displayed on a screen and causing a remote conference terminal apparatus used by an audience to display the image information on a remote screen. The conference terminal apparatus includes a screen control part which displays a plurality of image information items on the screen, a priority allocation part which allocates to each of the displayed image information items priority for being displayed on the remote screen, and an information transmission processing part which transmits to the remote conference terminal apparatus the displayed image information items and the priority allocated to each of the image information items.

According to another aspect of the present invention, there is provided a conference terminal apparatus which is used by an audience of an electronic conference for displaying image information transmitted from a remote conference terminal apparatus which is used by a speaker. The conference terminal apparatus includes an information reception processing part which receives a plurality of image information items which is displayed on a remote screen and priority information of the image information items for being displayed, and a display processing part which displays the received image information according to a number of screen which is used for displaying the image information items and the priority information.

According to a further aspect of the present invention, there is provided an electronic conference system, which includes a transmitting terminal apparatus which displays a plurality of image information items on a screen, allocates to each of the displayed image information items priority for being displayed on a remote screen, and transmits to a remote conference terminal apparatus the displayed image information items and the priority allocated to each of the image information items, and a terminal apparatus which receives a plurality of image information items transmitted from another conference terminal apparatus and priority information for displaying the received image information items, and displays the received image information according to the priority information and a number of screen which is used for displaying the image information.

According to a further aspect of the present invention, there is provided a method of transmitting image information items used in an electronic conference, which includes allocating to each of an plurality of image information items which is used in the electronic conference priority for being displayed on a remote screen, and transmitting to a remote conference terminal apparatus the displayed image information items and the priority allocated to each of the image information items.

According to a further aspect of the present invention, there is provided a method of displaying received image information items in an electronic conference, which includes receiving a plurality of image information items which is displayed on a remote screen and priority information of the image information items for being displayed, and displaying the received image information according to a number of screen which is used for displaying the image information items and the priority information.

As described above, the conference terminal apparatus can transmit to a remote conference terminal apparatus priority information allocated to each image information item, to thereby allow the remote conference terminal apparatus to select the image information item on the basis of the priority information which can be used as a criterion for determining whether or not the image information item is to be displayed.

BRIEF DESCRIPTION OF THE DRAWINGS

A preferred embodiment of the present invention will be described in detail by reference to the following figures, wherein.

DETAILED DESCRIPTION OF THE INVENTION

A preferred embodiment of the present invention will be described in detail by reference to the accompanying drawings.

Figure 1:
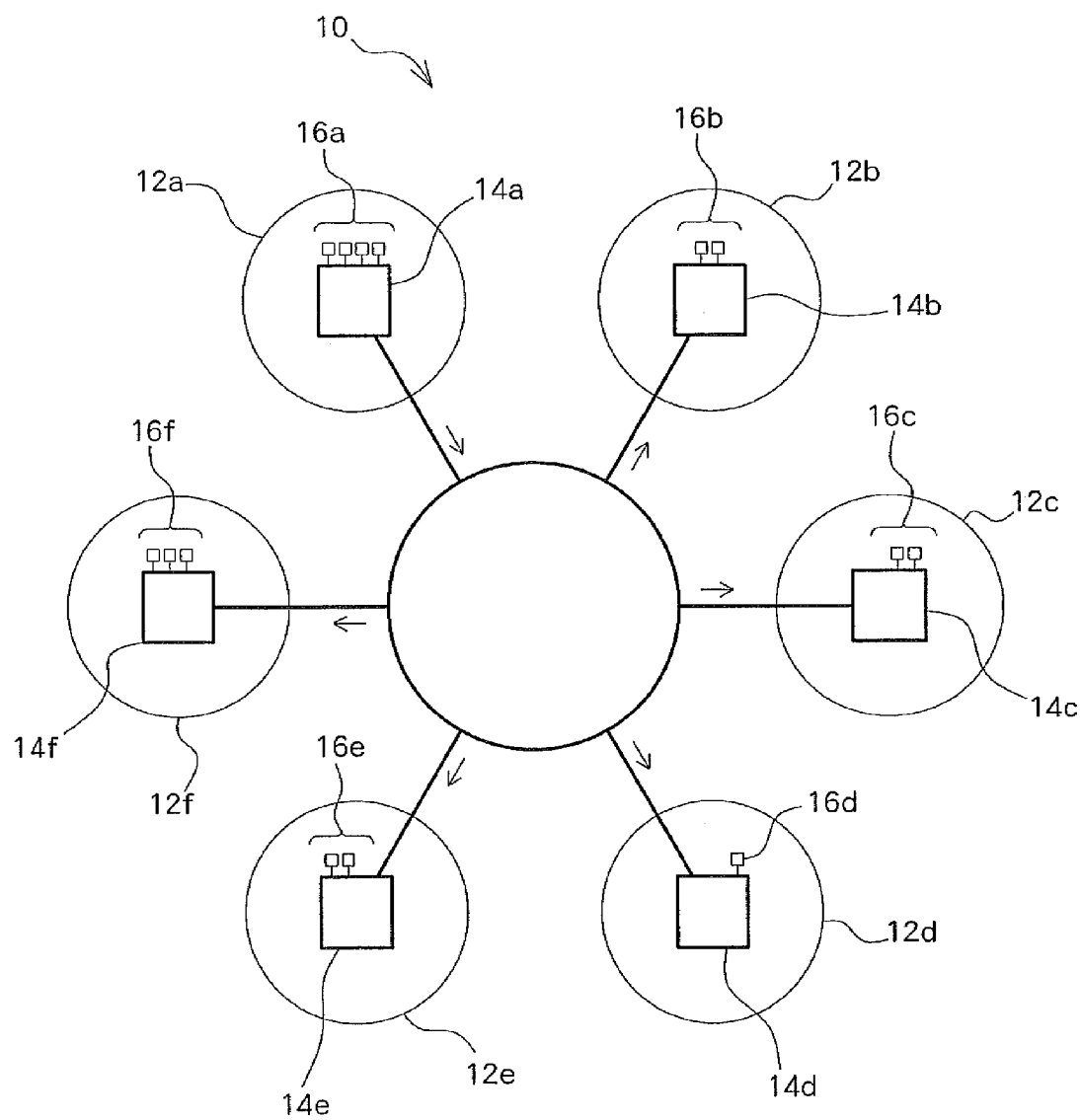
FIG. 1 is a structural view showing an overall structure of an electronic conference system according to the embodiment of the present invention.

FIG. 1 is a view showing an overall structure of an electronic conference system 10 according to an embodiment of the present invention. Referring to FIG. 1, in the electronic conference system 10, conference terminals 14a to 14f are installed in plural conference rooms 12a to 12f which are remote from each other and are connected to each other via a communication line. Here, each of the conference terminals 14a to 14f is an information processing terminal, such as a computer, which manages image information and audio information communicated in an electronic conference. It should be noted that the audio information, whose communication is not a purpose of the present invention, is not described in the present application.

In an electronic conference, image information which is displayed on a screen 16a in a certain conference room 12a is transmitted, via the communication line, to the other conference rooms 12b to 12f. The image information is received in the conference rooms 12b to 12f and is displayed on screens 16b to 16f. Thus, the common image information is displayed on the screens 16a to 16f of the conference rooms 12a to 12f, so that conference participants in the conference rooms 12a to 12f can share the common image information.

Each of the conference terminals 14a to 14f may be provided with display screens which can display multiple image information items simultaneously. However, the number of screens is not necessarily the same among all the conference terminals 14a to 14f.

When the number of screens provided in a conference terminal on the receiving side is greater than the number of image information items transmitted by a conference terminal on the transmitting side, all the image information items can be displayed simultaneously. However, when the number of information items to be transmitted is greater than the number of screens provided in the conference terminal on the receiving side, the conference terminal on the receiving side cannot display all the transmitted image information items simultaneously.

In order to address the above problem, according to the present embodiment, each of the conference terminals on the receiving side is provided with a criterion which allows selection of an image information item to be displayed on a screen, among image information items transmitted from the conference terminal on the transmitting side.

Figure 2:
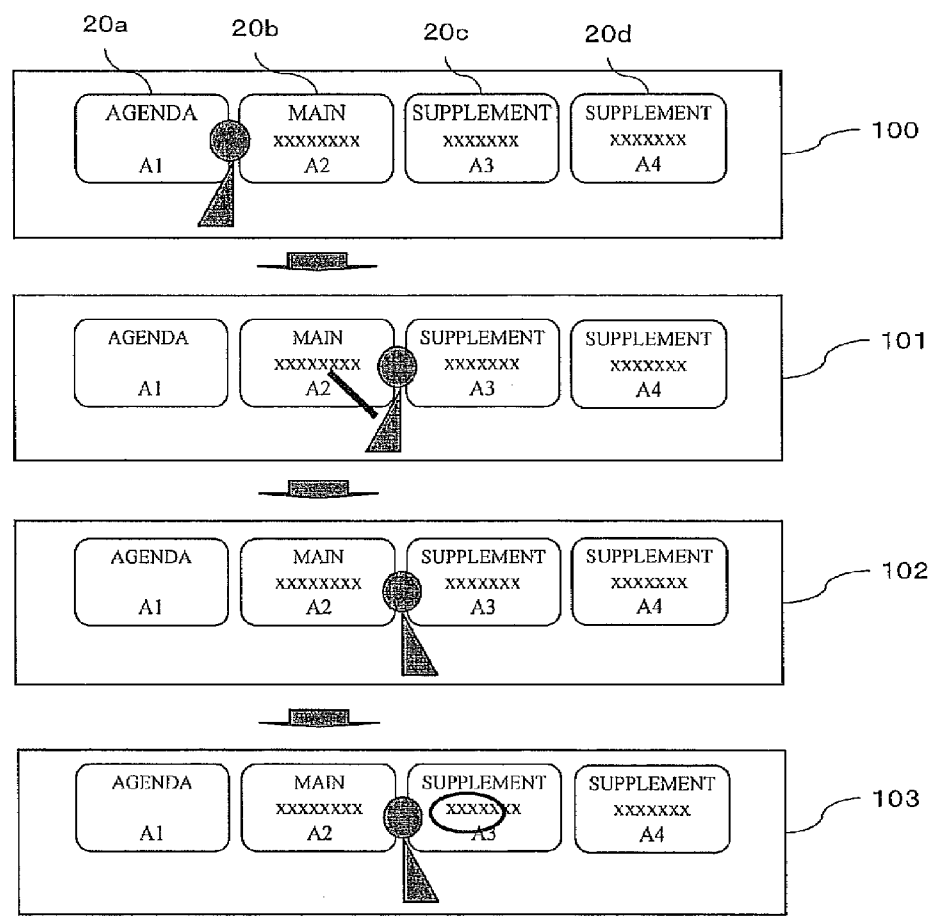
FIG. 2 is a view showing a flow of presentation being performed in a conference room.

Referring to FIG. 2, there will be described the criterion which is used by each of the conference terminals on the receiving side for selecting an image information item to be displayed on the screen. Here, in view that the conference terminals 14a to 14f have the same structure, for convenience of explanation, description will be provided while taking a local conference terminal 14a as a conference terminal which transmits image information and taking a remote conference terminal 14b which represents the other conference terminals 14b to 14f, as a conference terminal which receives the image information. The local conference terminal 14a has four screens 16a (which for the convenience of explanation will hereinafter be referred to as screens 20a to 20d) and the remote conference terminal 14b has two screens 16b (which for the convenience of explanation will hereinafter be referred to as screens 30a to 30b). FIG. 2 shows a flow of presentation being performed in the conference room 12a in which the local conference terminal 14a is located.

The conference room 12a includes the four screens 20a to 20d, which the presenter uses for presentation. Here, the screens shown in FIG. 2 are designated as 20a, 20b, 20c, and 20d from the left end of the figure. While the presenter uses all the images displayed on these four screens for explanation during the course of the presentation, the presenter does not use the images displayed on the four screens simultaneously. Normally, the presenter uses one displayed image at a time for explanation.

For example, at the start of presentation, the presenter, in order to explain the agenda of the presentation, moves near the screen 20a which displays an image concerning the agenda and explains the agenda using the image displayed on the screen 20a (step 100 in FIG. 2). Subsequently, in order to explain a main theme of the presentation, the presenter moves to the right side of the screen 20b and explains the main theme while using an image displayed on the screen 20b. Further, the presenter may use a pointer or a pointing device to indicate a specific point of the screen 20b for explanation (step 101 in FIG. 2). In the middle portion of the presentation, the presenter, in order to supplement explanation of the main theme, turns his or her body toward the screen 20c, which displays the supplemental contents, and explains the main theme, while using the image displayed on the display screen 20c (step 102 in FIG. 2). The presenter may also write on the displayed image (step 103 in FIG. 2).

As described above, the screen that the presenter uses for explanation changes with the progress of the presentation. Here, when the presenter uses a displayed image for explanation, the presenter takes some action with respect to the screen which displays the image that the presenter is using for explanation, while the other screens are left unused.

If the presenter has not taken any action on a certain screen for a long period of time, the image displayed on that screen is considered to have little relation to the contents that the presenter is attempting to explain at that time. Accordingly, the length of a time period during which the presenter takes no action on a screen is used as a criterion for setting a priority which is used for determining whether or not an image information item should be displayed on the display screens 30a and 30b of the remote conference terminal 14b.

Figure 3:
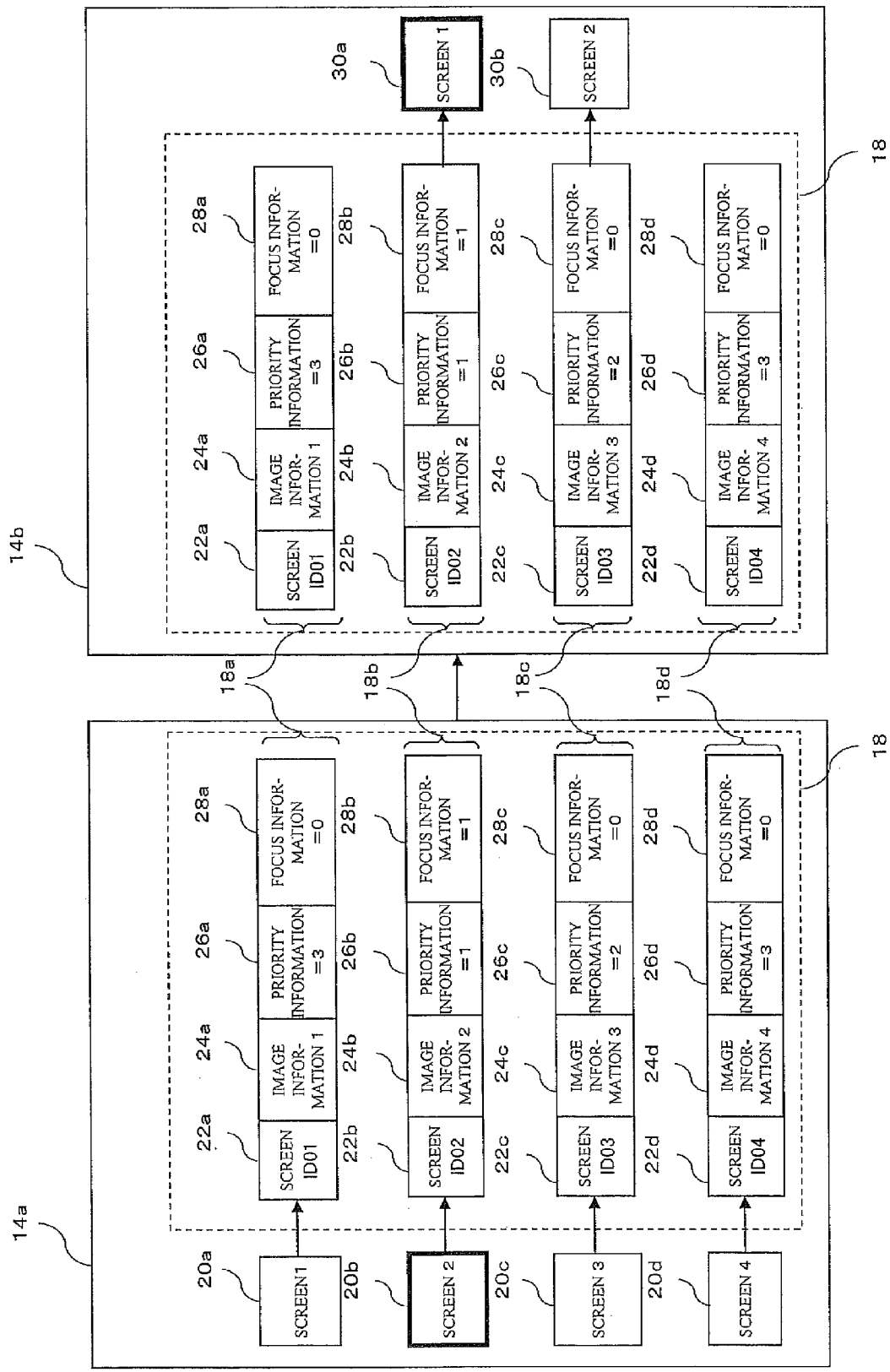
FIG. 3 is a schematic view showing a data structure of transmission information.

By reference to FIG. 3, there will now be described a method for selecting, by means of the remote conference terminal 14b, from among four image information items transmitted to the remote conference terminal 14b, image information items to be displayed on the two display screens, and an image information item to be displayed in a mode different from that of the other image information items. FIG. 3 schematically shows a data structure of transmission information 18 which is transmitted from the local conference terminal 14a to the remote conference terminal 14b.

The transmission information 18 includes transmission information items corresponding to the display screens provided for the local conference terminal 14a. Each of the transmission information items 18a to 18d includes a screen ID 22, image information 24, priority information 26, and focus information 28.

The screen ID 22 is an identifier corresponding to the screen 20 displayed by the local conference terminal 14a, and inherent screen IDs 22a to 22d are allocated to the corresponding screens 20a to 20d, respectively. The image information 24 is information of an image displayed on the screen 20 specified by the screen ID 22. The priority information 26 is information which is used as a criterion for determining whether or not the corresponding image information 24 is to be displayed on the remote conference terminal 14b. In the present embodiment, the lower the value of the priority information 26, the higher the possibility of the image information 24 corresponding to the screen ID 22 being displayed on the remote conference terminal 14b. The focus information 28 is information concerning the use or non-use of the image, which indicates whether or not the image information 24 displayed on the screen 20 of the local conference terminal 14a is being used by the presenter for explanation. Focus information "1" indicates that the image information is being used for explanation, and focus information "0" indicates that the image information is not being used for explanation.

The local conference terminal 14a associates the image information 24a to 24d, the priority information 26a to 26d, and the focus information 28a to 28d with each of the screen IDs 22a to 22d to thereby generate the transmission information item 18a to 18d and transmits the transmission information items 18a to 18d to the remote conference terminal 14b. Upon receiving the transmission information items 18a to 18d, the remote conference terminal 14b, selects image information to be displayed on the screens 30 of the remote conference terminal 14b on the basis of the priority information items 26a to 26d corresponding to the screen ID items 22a to 22d, respectively. Further, the remote conference terminal 14b displays the image information item(s) 24 corresponding to the screen ID(s) 22 for which the focus information is "1" on the screen in a mode different from that of the other image information item(s) 24. For example, such an image information item 24 is displayed together with a color image having a fixed width such that edges of the screen are trimmed with the color.

A method of selecting the image information 24 by the remote conference terminal 14b will be described as an embodiment of the invention. It is now assumed that the local conference terminal 14a generates transmission information 18 in which the priority information items corresponding to the screen IDs 22a to 22d are "3, 1, 2, and 3", respectively, and transmits the transmission information 18 to the remote conference terminal 14b. The remote conference terminal 14b selects, from among the transmission information items 18a to 18d, a number of transmission information items in which priority information items 26a to 26d have small values, corresponding to the number of screens of the remote conference terminal 14b. More specifically, assuming that the transmission information items 18 described above are arranged in the order of ascending values of the priority information (in the order of descending priority), the screen IDs 22 can be arranged in the following order: the screen ID 22b (priority information=1); the screen ID 22c (priority information=2); the screen ID 22a (priority information=3); and the screen ID 22d (priority information=3). Because the remote conference terminal 14b has two display screens 30a and 30b, the image information items 24 corresponding to the screen ID 22b and the ID 22c are to be displayed on these screens. In addition, the remote conference terminal 14b detects that the focus information 28 of the transmission information item 18b which is identified with the screen ID 22b is "1", and displays the image information item 24b in a mode different from that of the other image information items.

As described above, in order for the remote conference terminal 14b to select the image information 24 which is to be displayed on the screens 30, the local conference terminal 14a assigns to the image information items 24a to 24d, respectively, the priority information items 26a to 26d, which are used as a criterion for determining which of the image information items 24 should be displayed on the screens of the remote conference terminal 14b, and transmits the resulting transmission information items 18 to the remote conference terminal 14b. On the basis of the priority information items 26a to 26d, the remote conference terminal 14b selects the image information items 24 in equal number with screens of the remote conference terminal 14b, in the order of smaller values of the priority information 26 (i.e. in the order of higher priority).

Figure 4:
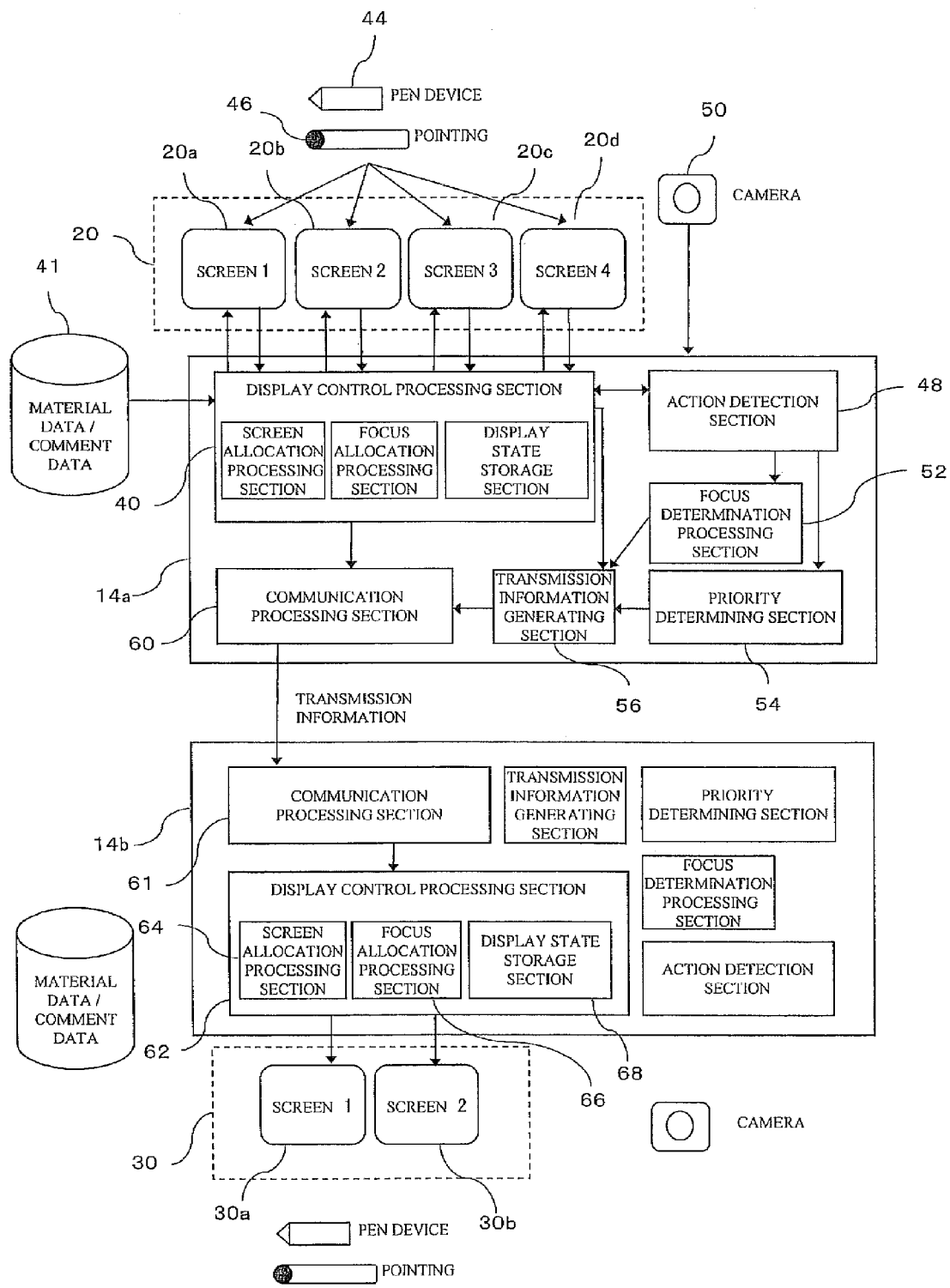
FIG. 4 is a block diagram showing structures of a local conference terminal and a remote conference terminal.

With reference to FIG. 4, the structures of the local conference terminal 14a and the remote conference terminal 14b of the present embodiment will be described. FIG. 4 is a block diagram showing the structures of the local conference terminal 14a and the remote conference terminal 14b. The local conference terminal 14a includes a display control processing section 40, an action detection section 48, a focus determination processing section 52, a priority determination section 54, a transmission information generating section 56, and a communication processing section 60. Meanwhile, the remote conference terminal 14b includes a communication processing section 61 and a display control processing section 62. The display control processing section 62 further includes a screen allocation processing section 64, a focus allocation processing section 66, and a display state storage section 68.

In view that the local conference terminal 14a and the remote conference terminal 14b have similar structures in the present embodiment, they are shown such that their structures correspond to each other in a block diagram of FIG. 4, and a difference in information flow is indicated by arrows. Here, for convenience of explanation, the remote conference terminal 14b and the local conference terminal 14a are designed as a terminal on the receiving side of the transmission information 18 and a terminal on the transmitting side of the transmission information 18, respectively, and it is also possible to transmit the transmission information 18 from the remote conference terminal 14b to the local conference terminal 14a.

The display control processing section 40 includes plural screens 20a to 20d and has a function of displaying the image information. The display control processing section 40 is connected to an external storage section 41 for obtaining material data or comment data (which will hereinafter be combined as material data).

Each of the screens 20a to 20d (which will hereinafter be represented by the screen 20a) has a function of displaying the image information transmitted from the display control processing section 40. The screen 20a further has a function of transmitting to the display control processing section 40, when the tip of a pen device touches the screen 20a, the screen ID 22, which is information for identifying the screen 20a; coordinate information indicating the position on the screen 20a touched by the tip of a pen device 44; and color identification information indicating the color of the pen device 44 which is used.

Upon receiving the screen ID 22, the coordinate information, and the color identification information, the display control processing section 40 displays an image of the color specified by the color identification information at the position on the screen 20a specified by the screen ID 22, which is specified by the coordinate information.

The displayed color image remains even after the tip of the pen device 44 moves. Accordingly, when the presenter moves the pen device 44 with the tip thereof touching the screen, the trail of the pen tip remains on the screen. Therefore, the presenter can write on the screen 20a by using the pen device 44.

The display control processing section 40 displays the material data, together with the image information which is added by the presenter by writing with the pen device 44 (which will hereinafter be referred to as additional image information), on each of the screens 20a to 20d. In the present embodiment, the image information 24 which is transmitted by the local conference terminal 14a to the remote conference terminal 14b refers to information which is obtained by superimposing the material data with the additional image information. The display control processing section 40 transmits the image information items 24a to 24d displayed on the screens 20a to 20d to the transmission information generating section 56, with the image information items 24a to 24d being associated with the screen IDs 22a to 22d of the screens 20a to 20d, respectively. The display control processing section 40 further transmits to the action detection section 48 each of the additional image information items displayed on the screens 20a to 20d, with the additional image information items being associated with the screen IDs 22a to 22d of the screens 20a to 20d, respectively.

The action detection section 48 is connected to a camera 50. The camera 50 is installed in the conference room 12a and captures images of all the screens 20a to 20d and images of the presenter within the frame of the camera 50 for generating imaging data. The action detection section 48 has a function of performing image analysis of the imaging data received from the camera 50, to thereby specify an action screen on which the presenter takes some action and an action type indicating the type of the action performed by the presenter. The action detection section 48 also has a function of specifying the action screen and the action type by means of the additional image information received from the display control processing section 40. The action detection section 48 includes an internal storage section m1 (not shown) which stores the screen ID 22 of the action screen and the action type. Further, the action detection section 48 transmits to the focus determination processing section 52 and the priority determining section 54 information of the screen ID 22 of the action screen and information of the action type corresponding to the screen ID 22.

The focus determination processing section 52 determines a value of the focus information 28 which specifies the screen 20 displaying the image information 24 which the presenter is using for explanation. The focus determination processing section 52 receives the screen ID 22 of the action screen and the action type from the action detection section 48, and, on the basis of the received information, generates the focus information 28 for identifying the image information 24 which is being used by the presenter for explanation. The focus determination processing section 52 includes an internal storage section m2 (not shown) which stores the screen IDs 22a to 22d and the focus information 28 corresponding to the screen IDs 22a to 22d. Further, the focus determination processing section 52 transmits to the transmission information generating section 56 the screen IDs 22a to 22d and the focus information 28 corresponding to the screen IDs 22a to 22d.

The priority determining section 54 determines a value of the priority information 26 which is used as a criterion for determining whether or not the image information 24 should be displayed on the screen of the remote conference terminal 14b. The priority determining section 54 receives the screen ID 22 of the action screen and the action type from the action detection section 48 and, on the basis of information thus received, generates, with respect to the image information items 24a to 24d displayed on the screens 20a to 20d, respectively, the priority information 26 indicating the priority which is used as a criterion for determining whether or not the remote conference terminal 14b should display the image information 24 on the screen. The priority determining section 54 stores the screen ID 22, the priority information 26, an event type (which will be described in detail below) 25, and an event receipt time (which will be described in detail below) 27 in association with the screen IDs 22a to 22d in an internal storage section m3 (not shown) provided within the priority determining section 54, and also transmits similar information to the transmission information generating section 56.

The transmission information generating section 56 generates the transmission information to be transmitted to the remote conference terminal 14b. The transmission information generating section 56 receives the focus information 28 from the focus determination processing section 52, receives the priority information 26 from the priority determining section 54, receives the image information 24 from the display control processing section 40, and generates the transmission information 18 in accordance with the information thus received and transmits the transmission information 18 to the communication processing section 60. The transmission information generating section 56 includes an internal storage section m4 (not shown) which stores a screen role 23, the priority information 26, the event type 25, and the event receiving time 27 in association with the screen IDs 22a to 22d. The transmission information generating section 56 generates the transmission information 18 on the basis of the information stored in the storage section m4 and the image information 24 received from the display control processing section 40.

The communication processing section 60 receives the transmission information 18 from the transmission information generating section 56 and transmits the transmission information 18 to the remote conference terminal 14b.

Here, the function of each section in the local conference terminal 14a is implemented by cooperative operation of applications and hardware resources provided within the local conference terminal 14a.

Now, the structure of the remote conference terminal 14b will be described.

The communication processing section 61 of the remote conference terminal 14b receives the transmission information 18 from the local conference terminal 14a, and transmits the transmission information 18 to the display control processing section 62.

The display control processing section 62 displays the image information 24 on the screens 30 of the remote conference terminal 14b. The display control processing section 62 includes plural (two in the present embodiment) screens 30a and 30b, the screen allocation processing section 64, the focus allocation processing section 66, and the display state storage section 68.

The display control processing section 62 receives the transmission information 18 from the communication processing section 61, displays the image information 24 in accordance with the screen allocation determined by the screen allocation processing section 64, and displays the image information item 24 determined by the focus allocation processing section 66 in a mode different from that of the other image information items 24.

The screen allocation processing section 64 allocates to the screens 30a and 30b of the remote conference terminal 14b the screen IDs 22 included in the received transmission information 18. The screen allocation processing section 64 includes an internal storage section m5 (not shown) which stores a remote screen ID 32 which is an identifier for specifying each of the screens 30a and 30b of the remote conference terminal 14b and the screen ID 22 of the transmission information 18 including the image information items 24 to be displayed on the screens 30 of the remote conference terminal 14b, in association with each other.

The focus allocation processing section 66 includes an internal storage section m6 (not shown) which stores, in association with each other, the remote screen ID 32 and the focus information 28 indicating whether or not the image information item 24 is to be displayed in a mode different from that of the other information items.

The display state storage section 68 is a storage section for storing the screen IDs 22 included in the transmission information 18 which correspond to the remote screen IDs 32a and 32b, and the focus information 28 included in the transmission information 18.

The display control processing section 62 displays on each of the screens 30a and 30b of the remote conference terminal 14b the image information 24 transmitted from the local conference terminal 14a. At this time, the display control processing section 62 selects the image information items 24 on the basis of the information stored in the display state storage section 68 and displays the image information 24 on the screens 30.

Here, each structural element in the remote conference terminal 14b is implemented by cooperative operation of applications and hardware resources provided within the local conference terminal 14b.

Figure 10:
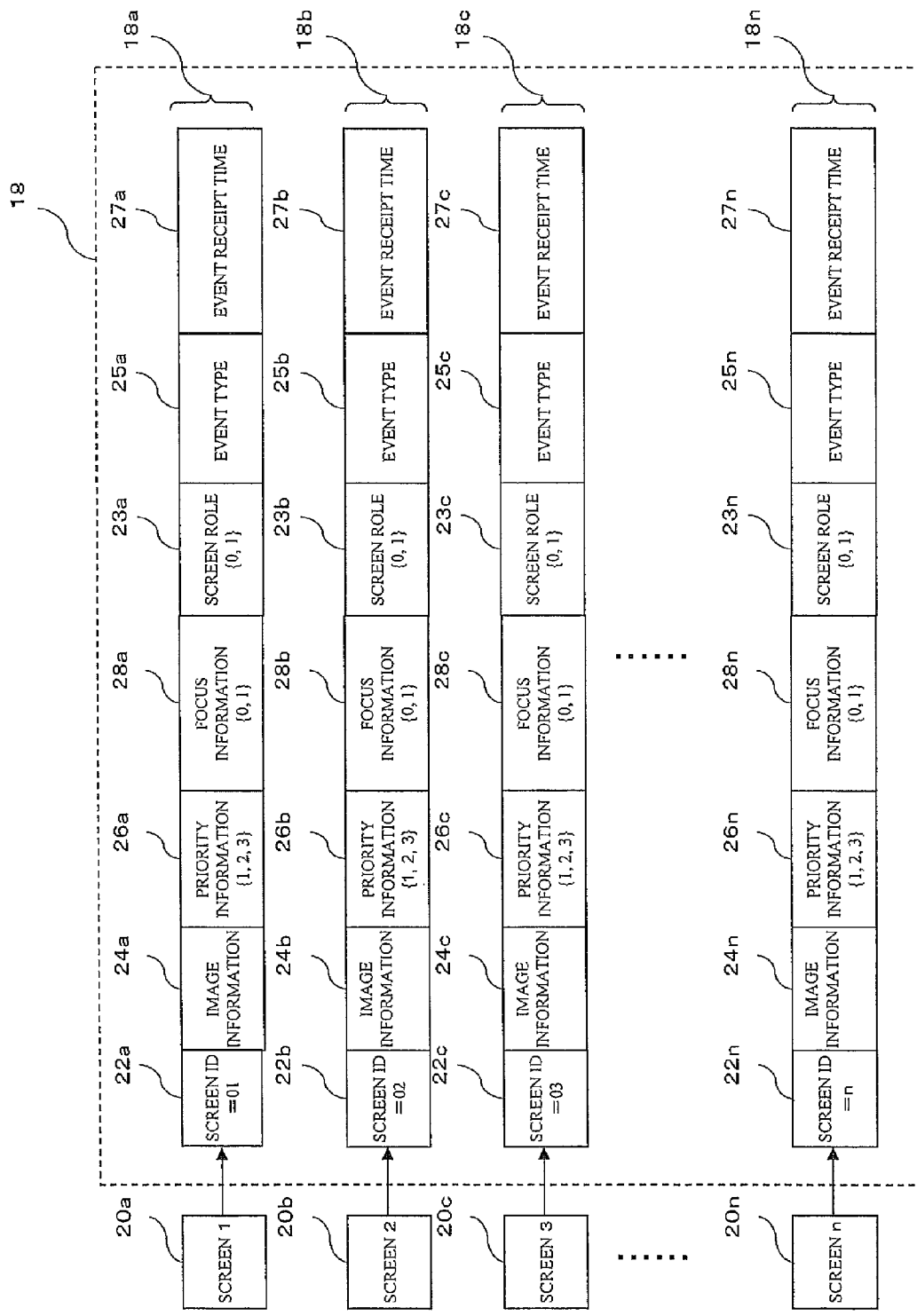
FIG. 10 is a detailed view showing a data structure of transmission information.

By reference to FIG. 10, the data structure of the transmission information 18 to be transmitted from the local conference terminal 14a to the remote conference terminal 14b will be described. The transmission information 18 shown in FIG. 10 is a detailed version of the transmission information 18 shown in FIG. 3. Accordingly, information items having the same roles as those shown in FIG. 3 are designated by the same reference numerals. The transmission information 18 includes the screen ID 22, the image information 24, the priority information 26, the focus information 28, the screen role 23, the event type 25, and the event receipt time 27.

The screen ID 22 is an identifier corresponding to each screen 20a to 20d displayed by the local conference terminal 14a. In the present embodiment, the number of screens of the local conference terminal 14a is four, and the inherent screen IDs 22a to 22d are assigned corresponding to the screens 20a to 20d, respectively.

The screen role 23 is information indicating whether or not the screen specified by the screen ID 22 is mainly used in the presentation. The screen which is mainly used in the presentation (hereinafter referred to as a main screen) is designated by "1" and other screens (hereinafter referred to as sub screens) are designated by "0". The value of the screen role 23 corresponding to each of the screens IDs 22a to 22d is fixed to a predetermined value.

The priority information 26 is information which is used as a criterion for determining whether or not the image information 24 corresponding to the screen ID 22 should be displayed in the remote conference terminal 14b. The priority information 26 can have a value of "1, 2, 3, nil", in the order of descending priority. In the present embodiment, the image information 24 of the transmission information 18 with a lower value of the priority information 26 is displayed more preferentially in the remote conference terminal 14b. More specifically, the lower the value of the priority information, the higher the priority of the image information 24. The value "nil" of the priority information 26 indicates a state in which the value is not fixed.

The focus information 28 is information indicating whether or not the image information 24 of the screen 20 which is specified by the screen ID 22 is being used by the presenter in the local conference terminal 14a. A value "0" of the focus information 28 indicates that the presenter is not using the image information 24, and a value "1" indicates that the presenter is using the image information 24.

The event type 25 is information indicating the type of the presenter's action with respect to the screen 20 and is synonymous with the action type described above. The event type 25 may be a type of the presenter's action, such as "orientation of body" indicating that the presenter has turned toward the screen 20, "write" indicating that the presenter has performed writing onto the screen 20, and "pointing" indicating that the presenter has pointed to a portion of the screen 20, and may also be information including "screen display" indicating that the display content on the screen 20 has been changed; i.e., that the page is changed, "Δt1 elapsed" indicating that a time period Δt1 has elapsed with the presenter taking no action on the screen 20 since the priority value has become "1", and "Δt2 elapsed" indicating that a time period Δt2 has elapsed with the presenter taking no action on the screen 20 since the priority value has become "2".

The event receipt time 27 indicates the time when the priority determining section 92 receives the event type 25 described above. The greater the value of the event receipt time 27, the later the time when the priority determining section 92 receives the event type 25.

The image information 24 is information concerning the image displayed on the screen 20 which is specified by the screen ID 22.

The detailed process and the process flow in the local conference terminal 14*a* and the remote conference terminal 14*b* will be described.

The display control processing section 40 displays the image information item on each of the screens 20*a* to 20*d*. The display control processing section 40 associates the screen IDs 22 of the screens 20*a* to 20*d* with the image information items 24 displayed on the screens 20*a* to 20*d* and transmits the information to the transmission information generating section 56. The display control processing section 40 also associates the screen IDs 22 of the screens 20*a* to 20*d* with the additional image information items displayed on the screens 20*a* to 20*d* and transmits the information to the action detection section 48.

The action detection section 48 may detect an action of the presenter by means of the following two examples. Each of the two examples will be described.

Figure 5:
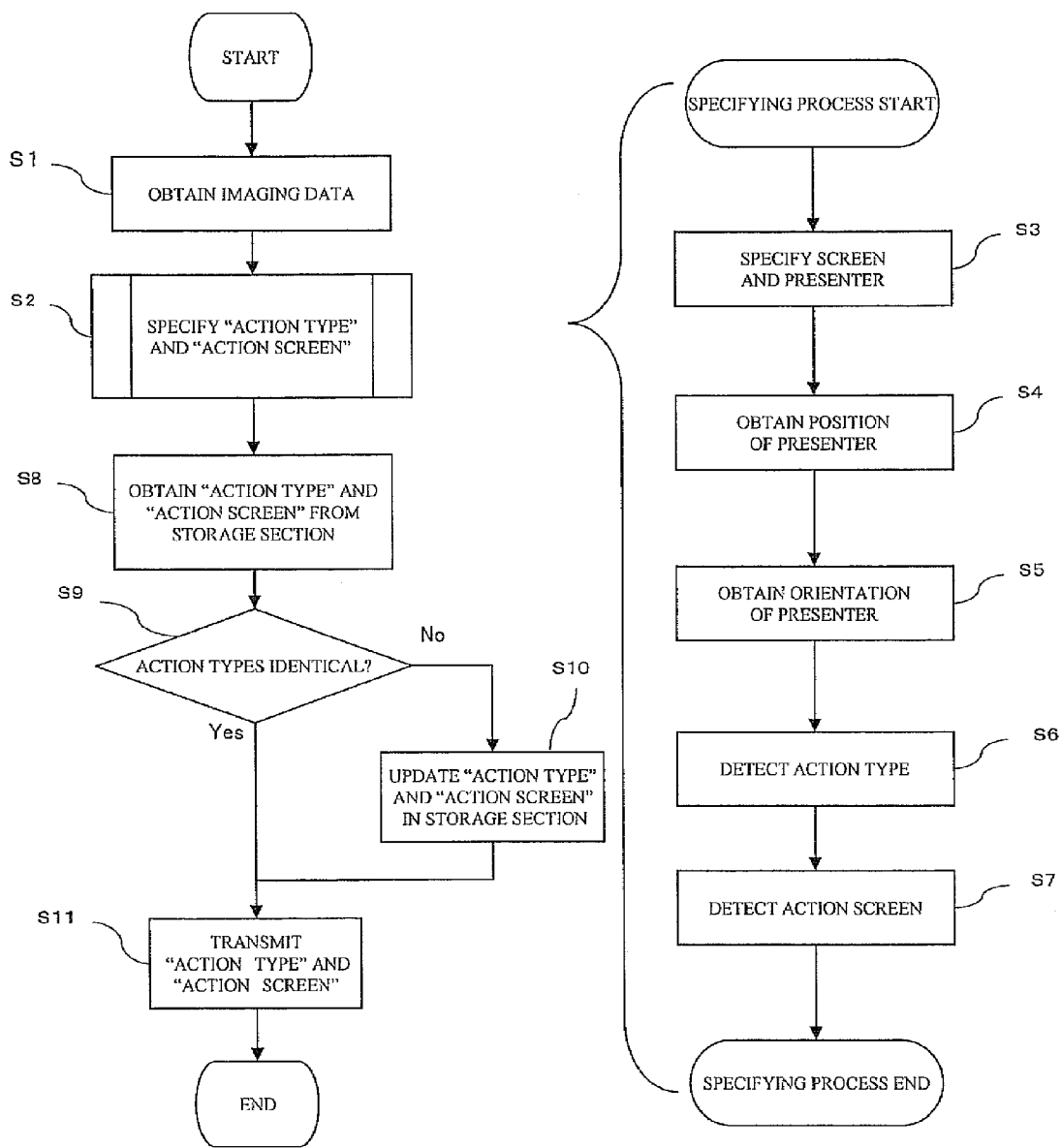
FIG. 5 is a flowchart showing a process flow for detecting an action of the presenter by analyzing imaging data.

The first example of the method is to detect an action of the presenter by analyzing the imaging data transmitted from the camera 50 connected to the local conference terminal 14*a*. This method will be described with reference to the flowchart shown in FIG. 5.

The action detection section 48 obtains the imaging data from the camera 50 (S1), and performs image analysis with respect to the imaging data to thereby specify the action type of the presenter and the action screen (S2).

The action detection section 48 specifies the action type and the action screen as follows. Specifically, the action detection section 48 performs image analysis on the basis of the received imaging data, to thereby identify the position and the shape of each of the screens 20*a* to 20*d*, the position and the shape of the presenter, and the background other than the screens 20*a* to 20*d* and the presenter, and stores the information as the position information and the image information (S3). From the information of the position of the screens 20 and the presenter, the action detection section 48 then detects a relative position of the presenter with respect to each of the screens 20*a* to 20*d* (S4).

Subsequently, the action detection section 48 detects the direction of the presenter's body on the basis of the information on the shape of the presenter. For example, the action detection section 48 detects the position of the presenter's nose and the positions of left and right end portions of the presenter's body, to thereby detect the orientation of the body from the relative position of the nose with respect to the end portions (S5).

The action detection section 48 detects the action type of the presenter on the basis of the image information concerning the shape of the presenter (S6). Then, the action detection section 48 specifies the action screen based on the relative position of the presenter with respect to each screen and the orientation of the presenter's body (S7). When the imaging data as shown in S102 of FIG. 2 is obtained, for example, the action detection section 48 detects, from the image analysis, that the presenter is positioned between the screen 20*b* and the screen 20*c* and that the presenter turns his body to the right as viewed from the camera 50, and therefore detects that the action screen is the "screen 20c" and that the action type is the "orientation of body" from the detected information.

The action detection section 48 further obtains, from the storage section m1, the action type corresponding to the screen ID 22 of the action screen which is detected (S8).

The action detection section 48 then determines whether or not the action type obtained by the image analysis and the action type obtained from the storage section m1 are identical. Specifically, the action detection section 48 determines whether or not the action type obtained by the image analysis of the imaging data by the process in step S2 is identical with the action type obtained by the process at step S8; i.e. the immediately previous action type which has already been stored (S9).

If these action types are different from each other (S9/NO), the action detection section 48 updates the information of the action type corresponding to the action screen stored in the storage section m1 to the action type which is obtained as a result of the image analysis (S10). The action detection section 48 then transmits, to the focus determination processing section 52 and the priority determining section 54, the information of the screen ID 22 of the action screen and of the action type corresponding to the action screen (S11). On the other hand, when the action types are identical (S9/YES), the action detection section 48 does not perform the processing in step S10; i.e., does not update the information stored in the storage section m1, and performs the processing in step S11.

Figure 6:
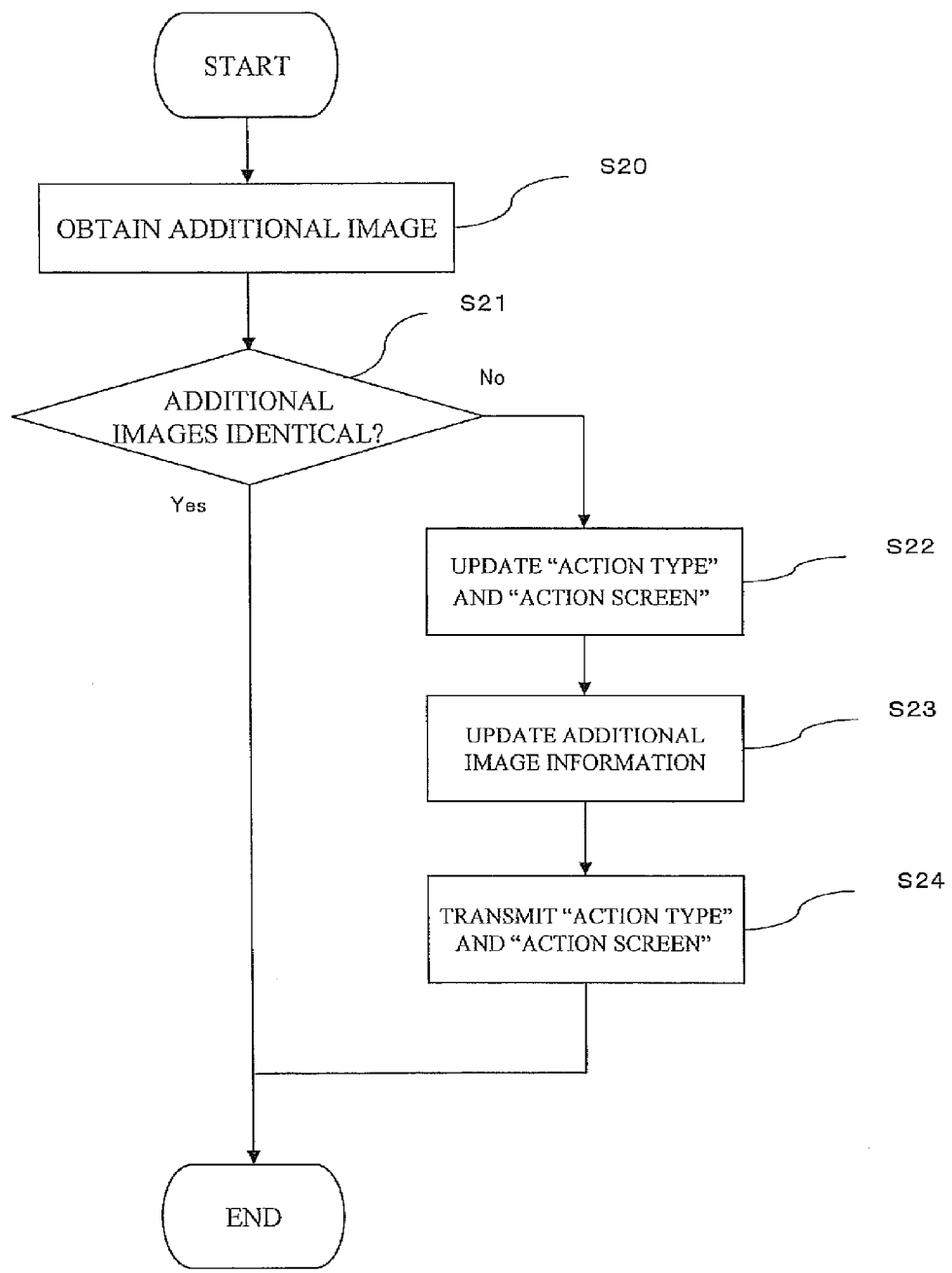
FIG. 6 is a flowchart showing a process flow for detecting an action of the presenter by using additional image information.

The second example of the method for detecting an action of the presenter will be now described with reference to the flowchart shown in FIG. 6. The flowchart shown in FIG. 6 shows a process flow for detecting the presenter's action by analyzing the additional image information transmitted from the display control processing section 40 to the action detection section 48.

The action detection section 48 periodically receives the screen ID 22 and the additional image information corresponding to the screen ID 22. The action detection section 48 also obtains, from the storage section m1 within the action detection section 48, the additional image information corresponding to the screen ID 22; i.e., the additional image information which has been received immediately previously (S20).

The action detection section 48 then determines whether or not the additional image information obtained from the storage section m1 and the additional image information received from the display control processing section 40 are identical (S21).

If the two additional image information items are different (S21/NO), the action detection section 48 updates the action type corresponding to the screen ID 22 stored in the storage section m1 to "write" (S22), and further updates the additional image information corresponding to the screen ID 22 stored in the storage section m1 to the additional image information received from the display control processing section 40 (S23). The action detection section 48 then obtains the screen ID 22 of the screen 20 on which the action of "write" has been taken and the action type corresponding to the screen ID 22 from the storage section m1, and transmits the thus-obtained information to the focus determination processing section 52 and the priority determining section 54. Specifically, the action detection section 48 determines that a write action has been taken on the screen 20 which is specified by the screen ID 22, and, after updating the information stored in the storage section m1, transmits the screen ID 22 of the action screen and the action type (S24). If the two additional image information items are identical (S21/YES), the process is completed without transmitting the information concerning the screen ID 22 of the action screen and the action type.

As described above, the action detection section 48 detects an action of the presenter from the imaging data obtained by capturing images of the screens and the presenter, which is transmitted from the camera 50, and also from the additional image information which is transmitted from the display control processing section 40.

Figure 7:
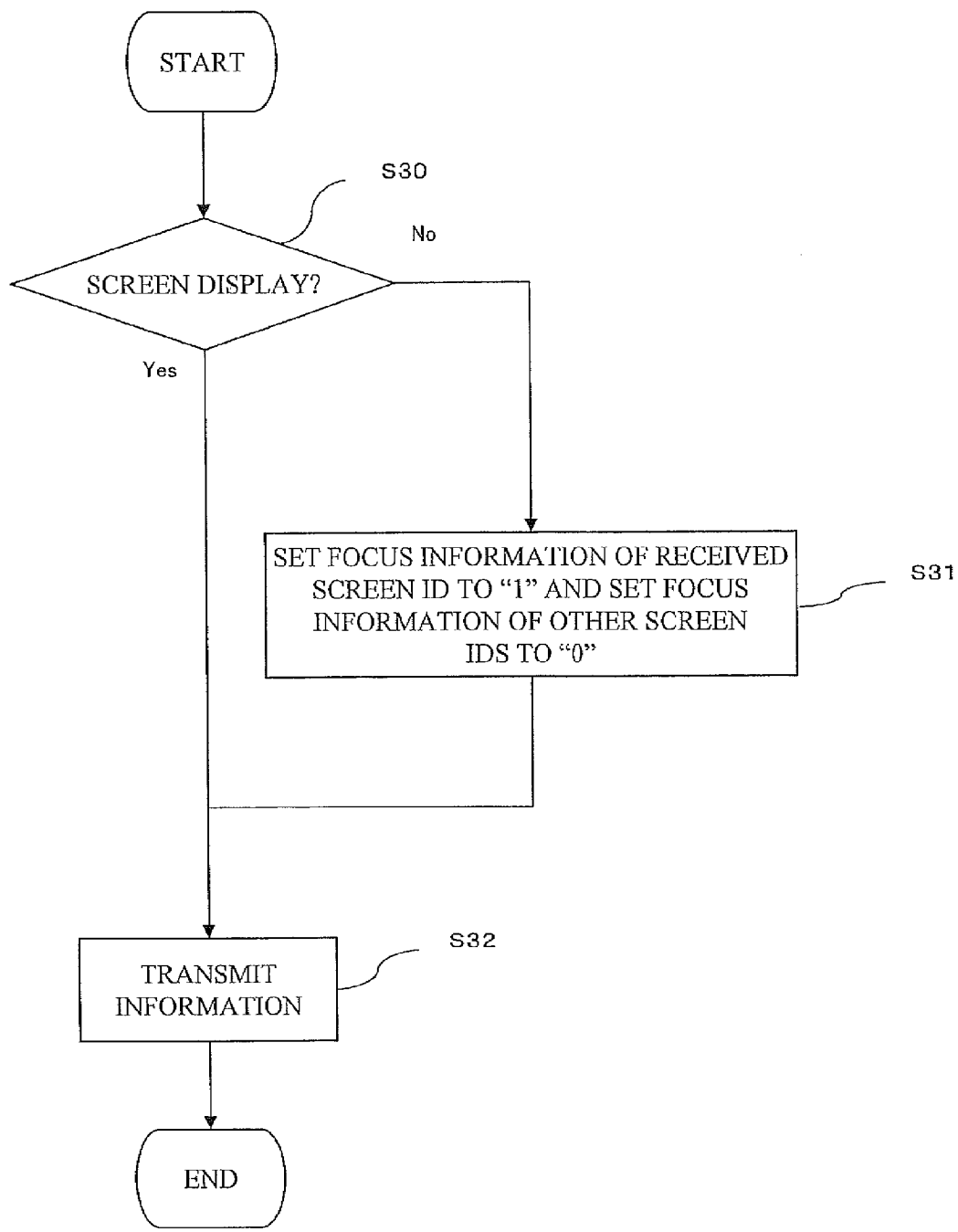
FIG. 7 is a flowchart showing a process flow in a focus determination processing section.

By reference to FIG. 7, the flow of processing performed by the focus determination processing section 52 will be described. FIG. 7 is a flowchart showing the process flow in the focus determination processing section 52. When obtaining the screen ID 22 of the action screen and the action type from the action detection section 48, the focus determination processing section 52 determines whether or not the action type which is received is "screen display" (S30). If the action type is "screen display" (S30/YES), the focus determination processing section 52 proceeds to perform the process in step S32 without updating the information stored in the storage section m2.

If the action type information which is received indicates actions other than "screen display" (S30/NO), the focus determination processing section 52 updates the information stored in the storage section m2 such that the focus information 28 corresponding to the screen ID 22 which is received is updated to "1" and the focus information 28 corresponding to other screen IDs 22 is updated to "0" (S31).

The focus determination processing section then obtains from the storage section m2 the screen IDs 22a to 22d and the focus information 28a to 28d corresponding to the screen IDs 22a to 22d, and transmits the information to the transmission information generating section 56 (S32).

Figure 8:
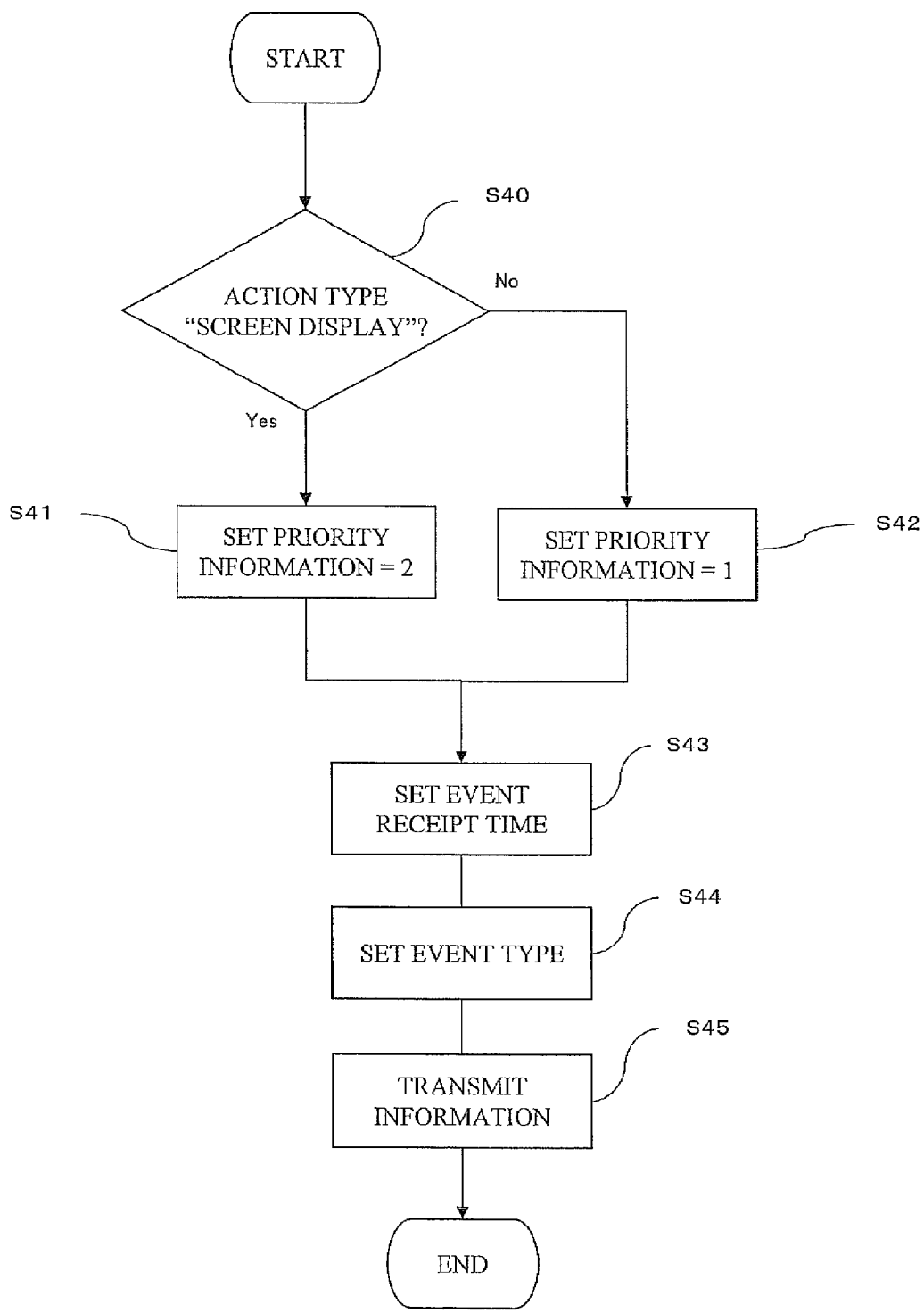
FIG. 8 is a flowchart showing a process flow of a priority determining section in a case where image information rises in priority.
Figure 9:
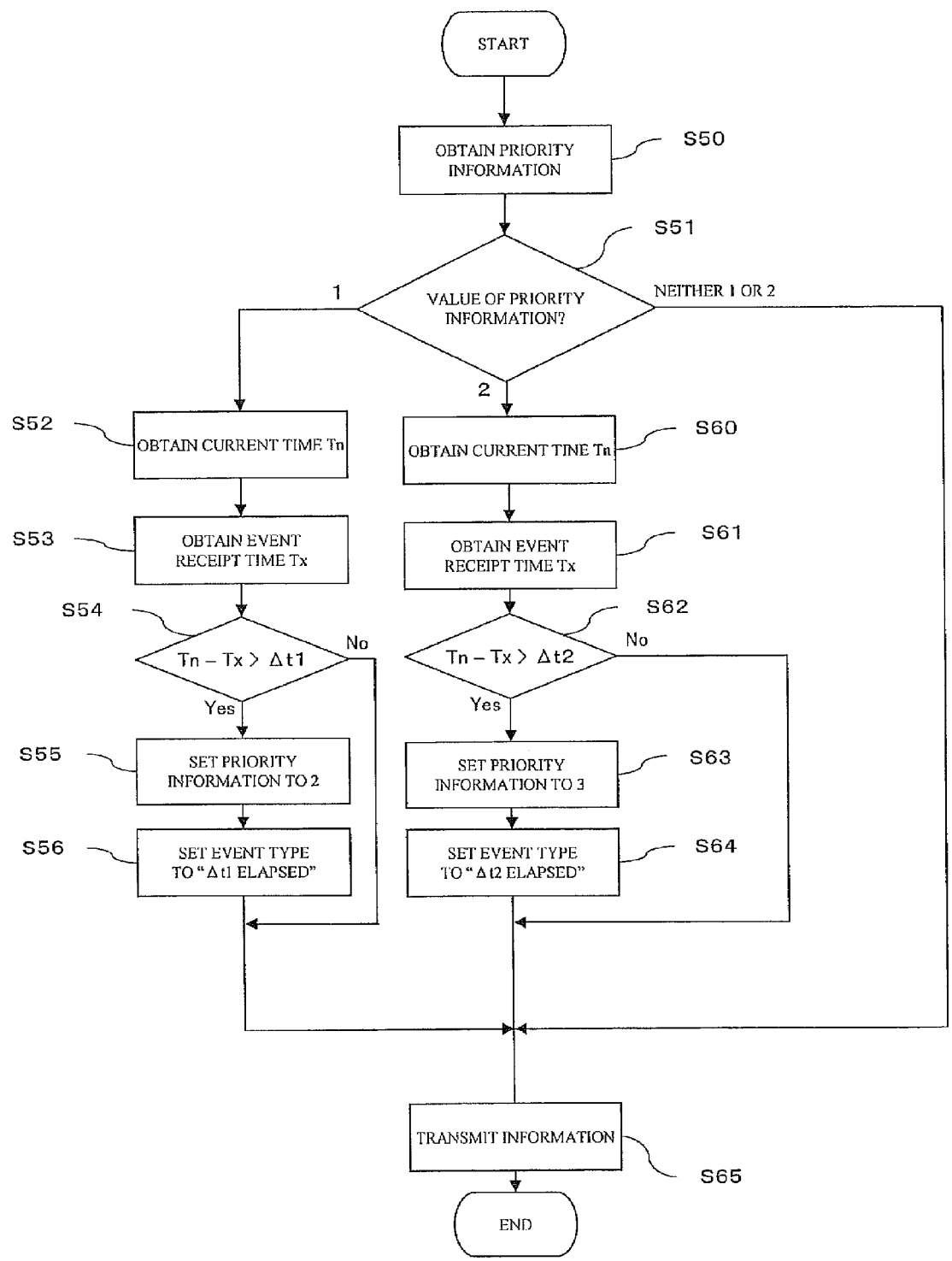
FIG. 9 is a flowchart showing a process flow of a priority determining section in a case where image information drops in priority.

By reference to FIGS. 8 and 9, the process flow in the priority determining section 54 will be described. FIG. 8 is a flowchart showing a process flow performed by the priority determining section 54 when the image information raises in priority (i.e. when the value of the priority information 26 decreases), and FIG. 9 is a flowchart showing a process flow performed by the priority determining section 54 when the image information drops in priority (i.e. when the value of the priority information 26 increases). Upon obtaining the screen ID 22 of the action screen and the action type from the action detection section 48, the priority determining section 54 starts the following process.

First, the process which is performed by the priority determining section 54 when the image information 24 raises in priority (i.e. when the value of the priority information 26 decreases) will be described with reference to FIG. 8. This process starts upon obtaining the screen ID 22 of the action screen and the action type from the action detection section 48.

The priority determining section 54 determines whether or not the action type which is received is "screen display" (S40). If the action type received is "screen display" (S40/YES), the priority determining section 54 updates the priority information, which is stored in the storage section m3, corresponding to the screen ID of the action screen which is received to "2", which is a value of the priority information 26 allocated to "screen display" (S41). If the action type which is received is not "screen display" (S40/NO), the priority determining section 54 determines that the action type transmitted from the action detection section 48 should be any one of "write", "orientation of body", and "pointing", and updates the priority information 26, which is stored in the storage section m3, corresponding to the screen ID of the action screen which is received, to "1" (S42). The priority determining section 54 then sets the time when the action type was received as the event receipt time in the storage section m2 (S43). The priority determining section 54 further sets in the storage section m3 the action type which is received as the event type 25 (S44). Subsequently, the priority determining section 54 obtains the screen IDs 22a to 22d and the corresponding priority information 26 from the storage section m3, and transmits the thus-obtained information to the transmission information generating section (S45).

Second, with reference to FIG. 9, the process which is performed by the priority determining section 54 when the image information 24 drops in priority (i.e. when the value of the priority information 26 increases) will be described. FIG. 9 is a flowchart showing a process flow for monitoring the priority information 26. This process is periodically performed in the priority determining section 54.

The priority determining section 54 obtains the priority information 26 of the screen IDs 22a to 22d from the storage section m3 (S50), and confirms the value of the priority information 26 which is obtained, thereby proceeding to different processes as described below (S51).

If the value of the priority information 26 is "1" (S51/priority information value=1), the priority determining section 54 obtains the current time Tn. The current time Tn is obtained from the system information of the local conference terminal 14a (S52). Then, the priority determining section 54 obtains the event receiving time Tx from the storage section m3. The event receipt time Tx represents the time when the priority determining section 54 receives the information of the action screen and the action type from the action detection section 48 (S53). The priority determining section 54 then calculates elapsed time (Tn−Tx) corresponding to a time difference between the current time Tn and the event receipt time Tx, and compares the elapsed time with a first priority decrease time $\Delta t1$ (S54). If the elapsed time (Tn−Tx) is greater than the first priority decrease time $\Delta t1$ (S54/YES), the priority determining section 54 increases, by one, the value of the priority information 26, which is stored in the storage section m3, corresponding to the screen ID 22 of the action screen which is received, thereby updating the value to "2". In other words, the level of the priority is lowered by one (S55). The priority determining section 54 also updates the event receipt time Tx to the current time Tn and updates the event type to "$\Delta t1$ elapsed" (S56). Meanwhile, if the elapsed time (Tn−Tx) is smaller than the first priority decrease time $\Delta t1$ (S54/NO), the priority determining section 54 proceeds to perform the process in step S65 without updating the information which is stored in the storage section m3.

If the value of the priority information 26 is "2" (S51/priority information value=2), the priority determining section 54 obtains the current time Tn (S60). Then, the priority determining section 54 obtains the event receipt time Tx from the storage section m3 (S61). The priority determining section 54 then calculates elapsed time (Tn−Tx) corresponding to a time difference between the current time Tn and the event receiving time Tx, and compares the elapsed time with a second priority decrease time $\Delta t2$ (S62). If the elapsed time (Tn−Tx) is greater than the second priority decrease time $\Delta t2$ (S62/YES), the priority determining section 54 updates the value of the priority information 26, which is stored in the storage section m3, corresponding to the screen ID 22 of the action screen which is received, to "3" (S63). The priority determining section 54 also updates the event receipt time Tx to the current time Tn and updates the event type to "Δt2 elapsed" (S64). If the elapsed time (Tn−Tx) is smaller than the second priority decrease time Δt2 (S62/NO), the priority determining section 54 proceeds to perform the processing in step S65 without updating the information stored in the storage section m3.

If the value of the priority information 26 is neither 1 or 2 (S51/priority information value=neither 1 or 2), the priority determining section 54 proceeds to perform the processing in step S65 without updating the information stored in the storage section m3.

After performing the processing in accordance with the value of the priority information 26 as described above, the priority determining section 54 obtains the screen IDs 22a to 22d, the priority information 26 corresponding to the screen IDs 22a to 22d, the event type 25, and the event receipt time Tx, and transmits the obtained information to the transmission information generating section 56 (S65).

Upon receiving the screen IDs 22a to 22d and the corresponding focus information 28 from the focus determination processing section 52, the transmission information generating section 56 updates the values of the focus information 28 stored in the storage section m4 to the values of the focus information 28 which are received. Further, upon receiving the screen IDs 22a to 22d and the corresponding priority information 26 from the priority determining section 54, the transmission information generating section 56 updates the values of the priority information 26 stored in the storage section m4 to the values of the priority information 26 which are received.

The transmission information generating section 56 periodically receives the screen IDs 22a to 22d and the corresponding image information items 24a to 24d from the display control processing section 40. Then, the transmission information generating section 56 obtains the screen IDs 22a to 22d and the corresponding screen roles 23a to 23d, the corresponding priority information items 26a to 26d, the corresponding focus information items 28a to 28d, the corresponding event types 25a to 25d, and the corresponding event receipt times 27a to 27d from the storage section m4. The transmission information generating section 56 then adds the image information 24 with the corresponding screen ID 22 to the information described above to thereby generate the transmission information 18, and transmits the transmission information to the communication control processing section 58.

The communication processing section 58 transmits, to the remote conference terminal 14b which is currently connected, the transmission information 18 which is received from the transmission information generating section 56.

The local conference terminal 14a has the above-described structure, and performs the above-described processing.

The processing performed by the remote conference terminal 14b will now be described.

The communication processing section 61 receives the transmission information 18 from the local conference terminal 14a and transmits the transmission information 18 to the display control processing section 62.

Figure 11:
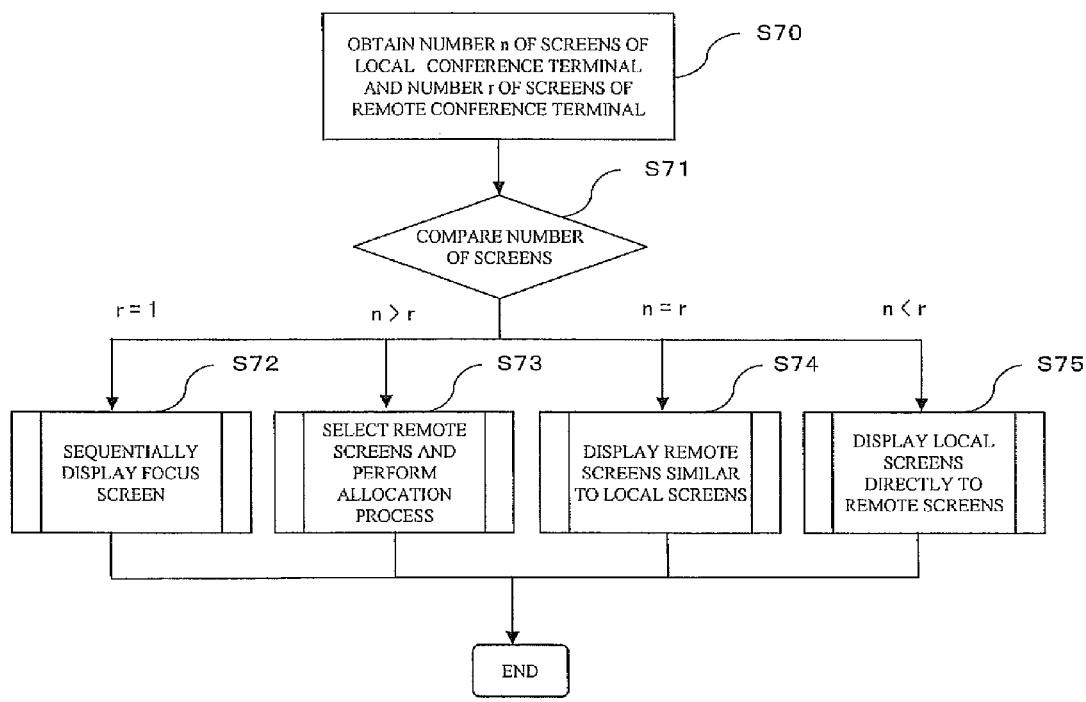
FIG. 11 is a flowchart showing a process flow performed in accordance with the number of screens in a remote conference terminal.
Figure 12:
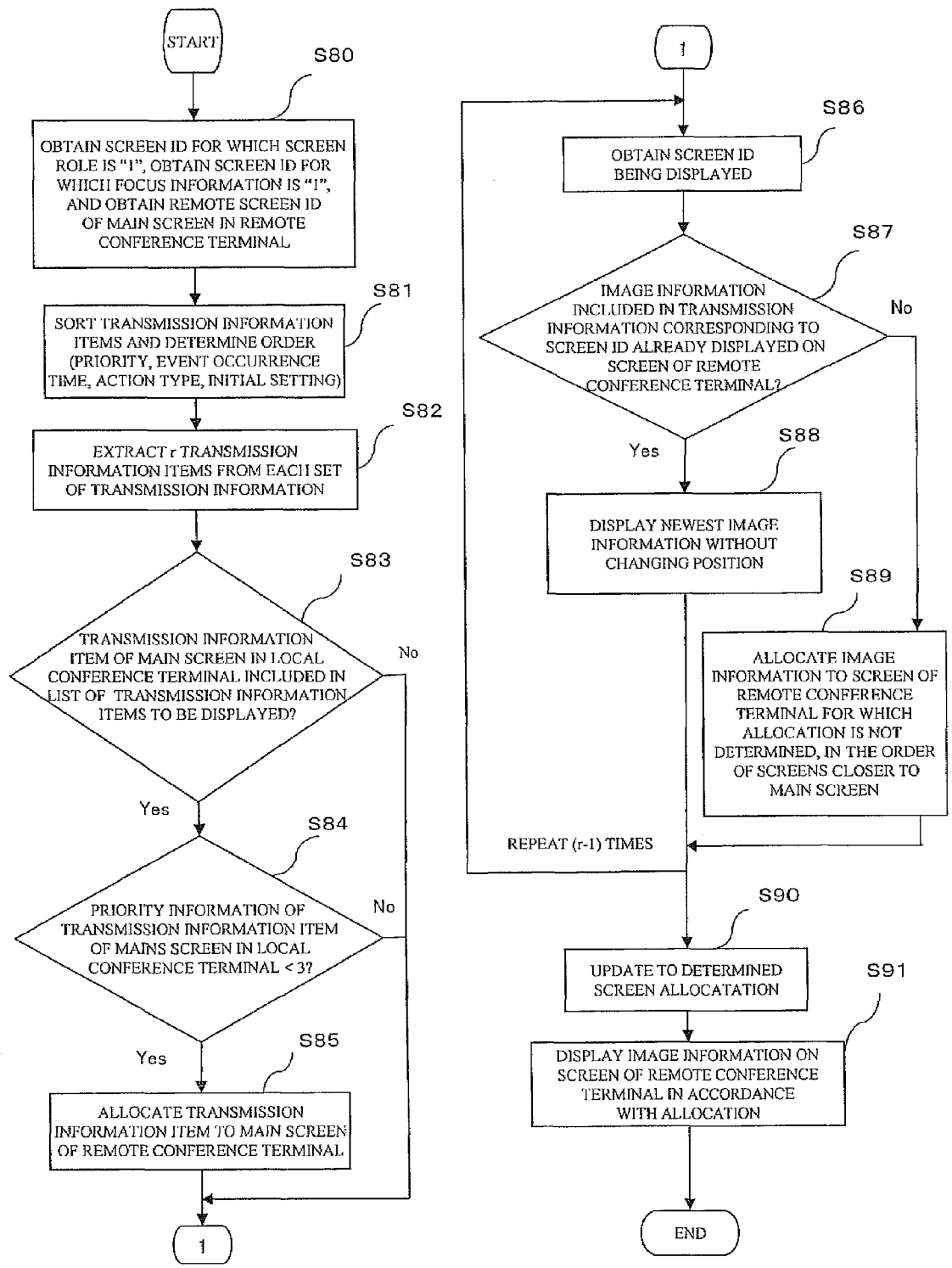
FIG. 12 is a flowchart showing a flow of a screen allocating process when the number of screens of a local conference terminal is greater than that of a remote conference terminal.

By reference to the flowcharts shown in FIGS. 11 and 12, a method of screen allocation performed by the screen allocation processing section 64 will be described. FIG. 11 is a flowchart showing a process flow in accordance with the number of screens of the remote conference terminal 14b. FIG. 12 is a flowchart showing a flow of the screen allocation processing performed by the screen allocation processing section 64 when the number of screens of the local conference terminal 14a is greater than the number of screens of the remote conference terminal 14b.

The screen allocation processing section 64 first obtains the number of screens (=r) of the remote conference terminal 14b, which is preset in the remote conference terminal 14b. The screen allocation processing section 64 receives the transmission information 18 from the communication processing section 61, and obtains the number of screens (=n) of the local conference terminal 14a from the number of types of the screen IDs 22 included in the transmission information 18 (S70). The screen allocation processing section 64 then compares the number r of screens of the remote conference terminal 14b with the number n of the screens of the local conference terminal 14a (S71).

If the number r of screens of the remote conference terminal 14b is one (r=1), the remote conference terminal 14b displays the image information 24 of the screen 20 which is displayed in a focused manner on the local conference terminal 14a. Accordingly, the screen allocation processing section 64 specifies the screen ID 22 for which the focus information 28 is "1", among the transmission information items 18a to 18d, and allocates the screen ID 22 which is specified to the screen 30 of the remote conference terminal 14b.

The process which is performed when the number r of screens of the remote conference terminal 14b is smaller than the number n of screens of the local conference terminal 14a (n>r) will be described in detail below (S73).

If the number r of screens of the remote conference terminal 14b equals (n=r) or is greater than (n<r) the number n of screens of the local conference terminal 14a, the following processing is performed. Here, the screens 30 of the remote conference terminal 14b are associated, in advance, with the screen IDs 22 included in the transmission information 18. Then, upon receiving the transmission information 18, the remote conference terminal 14b allocates the screen IDs 22a to 22d to the associated screens 30 of the remote conference terminal 14b (S74 and S75).

As described above, the screen allocation processing section 64 compares the number of image information items 24 transmitted from the local conference terminal 14a with the number of screens of the remote conference terminal 14b, to thereby determine allocation of the screens.

The processing which is performed when the number r of screens of the remote conference terminal 14b is smaller than the number n of screens of the local conference terminal 14a (n>r) will be described in detail with reference to FIG. 12. In the present embodiment, the number n of screens provided in the local conference terminal 14a is four, and four transmission information items 18a to 18d are transmitted. Further, the remote conference terminal 14b has two screens (r=2), a screen 30a and a screen 30b.

The screen allocation processing section 64 obtains the screen ID 22 of the transmission information 18 for which the value of the screen role 23 is "1". Because the value of the screen role 23 of the transmission information item 18c is "1" in the present embodiment, the screen allocation processing section 64 obtains the screen ID 22c. Here, the values of the screen role 23 are previously allocated to the transmission information items 18a to 18d in the local conference terminal 14a, and remain unchanged in the remote conference terminal 14b. Subsequently, the screen allocation processing section 64 obtains the screen ID 22 for which the value of the focus information 28 is "1". The screen allocation processing section 64 further obtains the remote screen ID 32, which is an identifier of the main screen in the remote conference terminal 14b. In the present embodiment, in view that the screen 30b of the remote conference terminal 14b is assumed to be a main screen, the screen allocation processing section 64 obtains the remote screen ID 32b corresponding to the screen 30b.

Then, the screen allocation processing section 64 sorts the transmission information items 18a to 18d which are received, so as to determine the order. The criteria for determining the order when rearranging the transmission information items are as follows. The smaller the value of the priority information 26 (i.e. the higher the priority), the higher the rank order. With regard to the transmission information items having the same value of the priority information 26, the greater the value of the event receipt time 27, the higher the rank order. In other words, the later the occurrence of the event, the higher the rank order. When the event receipt time 27 is also the same, a higher rank order is placed sequentially in the order of "write", "orientation of body", "pointing", "screen display", "Δt1 elapsed", and "Δt2 elapsed". If the type of event 25 is also the same, the order of the transmission information items 18a to 18d which has been preset as an initial value is used. For example, the smaller the number of the screen ID 22, the higher the rank order (S81).

Then, the screen allocation processing section 64 sequentially extracts the transmission information items 18a to 18d which are thus rearranged from the higher rank, by reference to the number corresponding to the number (=r) of screens of the remote conference terminal 14b (S82). In other words, the screen allocation processing section 64 extracts the same number of transmission information items 18 as the number of screens of the remote conference terminal 14b in the order of higher rank.

The screen allocation processing section 64 then confirms whether or not the transmission information item 18 in which the value of the screen role is "1"; i.e., the transmission information of the main screen in the local conference terminal 14a, is included in the list of the transmission information items extracted in step S82, which is to be displayed (S83).

If the transmission information item 18 in which the value of the screen role 23 is "1" is included in the transmission information items 18 which are extracted (S83/YES), a determination is made as to whether or not the value of the priority information 26 of the transmission information item 18 is less than 3. In other words, the priority information 26 of the image information item 24 which is being displayed on the main screen in the local conference terminal 14a is examined (S84). If the transmission information item 18 in which the value of the screen role 23 is "1" is not included (S83/NO), processing proceeds to step S86.

If the value of the priority information 26 in the transmission information item 18 in which the value of the screen role 23 is "1" is less than 3 (i.e. the priority is high) (S84/YES), the screen allocation processing section 64 allocates the transmission information item 18 in which the value of the screen role 23 is "1" to the screen 30b which is the main screen in the remote conference terminal 14b (S85). Specifically, the screen allocation processing section 64 associates the screen ID 32b with the screen ID 22 of the transmission information item 18 in which the value of the screen role 23 is "1", and stores the information in the storage section m5 of the screen allocation processing section 64. On the other hand, if the value of the priority information 26 in the transmission information item 18 in which the value of the screen role 23 is "1" is 3 or greater (i.e. the priority is low) (S84/NO), processing proceeds to step S86.

Then, a screen allocation process with respect to the sub screen in the remote conference terminal 14b is to be performed. This process is performed with the transmission information items 18a to 18d which are rearranged in step S81 being compared one by one. In this process, however, the transmission information item 18 which has been allocated with respect to the main screen in the above processing in steps S83 to S85 is eliminated.

The screen allocation processing section 64 first obtains a single transmission information item 18 in accordance with the order of the transmission information items 18 which are extracted (S86).

The screen allocation processing section 64 then determines whether or not the image information 24 in the transmission information item 18 obtained in step S86, which is a subject of comparison, is being displayed on either the screen 30a or 30b of the remote conference terminal 14b. More specifically, the screen allocation processing section 64 obtains the screen IDs 22 associated with the remote screen IDs 32a and 32b from the display state storage section 68. In other words, the screen allocation processing section 64 obtains the transmission information items 18 including the image information items 24 already displayed on the screens 30a and 30b of the remote conference terminal 14a. The screen allocation processing section 64 then compares the screen ID 22 of the transmission information obtained in step S86 with each of the screen IDs 22 obtained from the display state storage section 68, to thereby determine whether or not the two IDs are identical. Specifically, a determination is made as to whether or not the screen ID 22 of the transmission information item 18 which is an object of comparison is identical with either one of the screen IDs 22 corresponding to the image information items 24 which are already displayed on the screen 30a and 30b of the remote conference terminal 14b (S87).

If either of the screen IDs 22 is identical with the screen ID 22 of the transmission information item 18 which is an object of comparison (S87/YES), the screen allocation processing section 64 leaves unchanged the remote screen ID 32 of the remote conference terminal 14 corresponding to the screen ID 22. More specifically, the screen allocation processing section 64 maintains the screen ID 22 of the transmission information 18 obtained in step S86 and the corresponding remote screen ID 32 in the storage section m5 of the screen allocation processing section 64. In other words, when the screen 30 of the remote conference terminal 14b displays the image information 24 corresponding to the screen ID 22 which is identical with that of the comparison subject, the screen allocation processing section 64 leaves unchanged the image information corresponding to the identical screen ID 22 displayed on the screen 30 (S88).

If, on the other hand, neither screen ID 22 is identical with the screen ID 22 of the object of comparison (S87/NO), the screen allocation processing section 64 allocates the screen ID 22 of the object of comparison to the screen of the remote conference terminal 14b which is closer to the main screen (in the present embodiment, the screen other than the main screen), among the screens 30 for which screen allocation has not been determined. Specifically, the screen allocation processing section 64 stores, in the storage section m5 thereof, the screen ID 22 in association with the remote screen ID 32 which corresponds to the remote screen ID 32 of the screen closer to the main screen and which has not been associated with the screen ID 22. Here, the information indicating the order of the screens which are closer to or further from the main screen is previously registered in the remote conference terminal 14b, and the screen allocation processing section 64 determines the order of the screens 30 in accordance with this order information (S89).

The screen allocation processing section 64 repeats the processing performed in steps S86 to S89 in a number of times corresponding to the number of screens of the remote conference terminal 14b, and stores in the storage section m5 the screen IDs 22 of the transmission information items 18 corresponding to all the remote screen IDs 32.

The display control processing section 62 obtains the remote screen IDs 32a and 32b and the screen IDs 22 of the corresponding transmission information items 18 from the storage section m5 of the screen allocation section 64, and updates the information stored in the display state storage section 68 to the information of the screen allocation which is obtained. In other words, the display control processing section 62 updates the information stored in the display state storage section 68 to the screen IDs 22 corresponding to the image information 24 to be displayed (S90). After the update of information, the screen allocation processing section 64 clears the information in the storage section m5.

The focus allocation processing section 66 has a function of associating the display mode of the image information 24 with each of the screens 30a and 30b of the remote conference terminal 14b. The focus allocation processing section 66 obtains the screen ID 22 of the transmission information item 18 in which the value of the focus information 28 is "1" among the transmission information items 18a to 18d.

The focus allocation processing section 66 further obtains the screen IDs 22 corresponding to the remote screen IDs 32a and 32b, respectively, and the remote screen IDs 32 from the display state storage section 68. In other words, the focus allocation processing section 66 obtains the screen IDs 22 corresponding to the image information 24 to be displayed on the screens 30 of the remote conference terminal 14b.

The focus allocation processing section 66 then determines whether or not the value of the focus information 28 of the transmission information item 18 corresponding to the screen IDs 22 obtained from the display state storage section 68 is "1".

If the value of the focus information 28 is "1", the focus allocation processing section 66 updates the screen ID 22 in the storage section m6 and also updates the focus information 28 in storage section m6 corresponding to the remote screen ID 32 obtained from the display state storage section 68 to "1" (i.e. display in an emphasized manner, or display in a mode other than that of other screens). If, on the other hand, the value of the focus information 28 is a value other than "1", the focus allocation processing section 66 updates the focus information 28 to "0" (i.e. display in a normal manner, or display in a manner similar to that of other screens). As such, the focus information items 28 corresponding to the remote screen IDs 32a and 32b are stored in the storage section m6.

The display control processing section 62 obtains from the storage section m6 of the focus allocation processing section 66 the remote screen IDs 32a and 32b of the remote conference terminal 14b and the focus information items 28 corresponding to the remote screen IDs 32a and 32b, and registers the thus-obtained values of the focus information items 28 in the display state storage section 68.

The display control processing section 62 obtains the screen IDs 22 corresponding to the remote screen IDs 32a and 32b from the display state storage section 68, and then displays the image information 24 included in the transmission information items 18 which are identified by the thus-obtained screen IDs 22, on the screens 30a and 30b of the remote conference terminal 14b, respectively (S91).

Further, the display control processing section 62 obtains from the display state storage section 68 the focus information 28 corresponding to the remote screen IDs 32a and 32b.

If the value of the focus information 28 corresponding to a certain remote screen ID 32 is "1", the display control processing section 62 displays the image information 24 which is to be displayed on the screen 30 specified by the remote screen ID 32 on the screen 30 in a mode different from that of the other screens.

As described above, the local conference terminal 14a can transmit to the remote conference terminal 14b the image information 24, and the priority information 26, the event type 25, and the event receipt time 27 which are allocated to the image information 24, thereby allowing the remote conference terminal 14b to select the image information 24 on the basis of the thus-obtained information.

Figure 13:
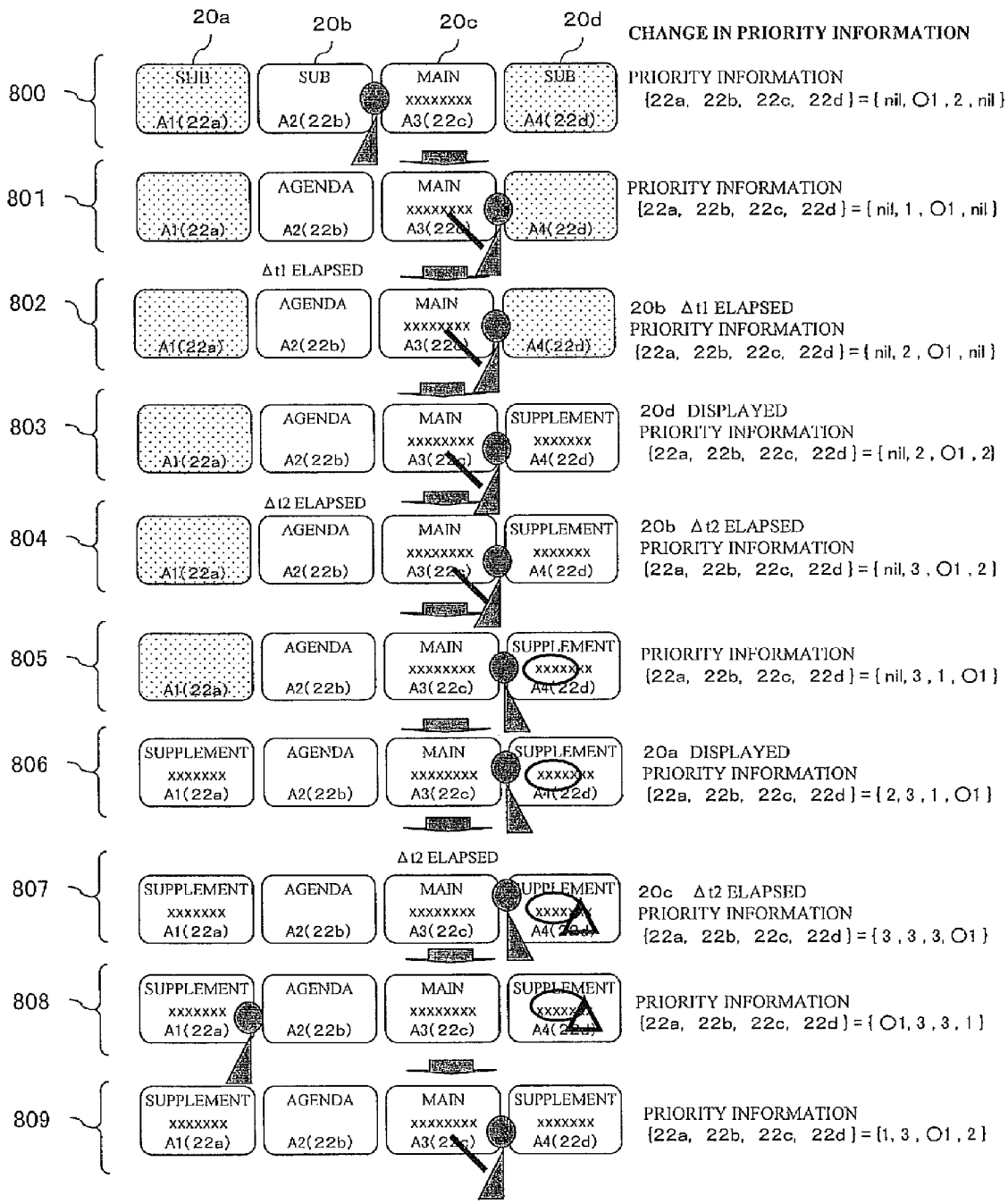
FIG. 13 is a view showing positions of a screen and a presenter in a conference room where the local conference terminal is located.

By reference to FIG. 13, there will now be described a change in the value of the priority information 26 and a change in the value of the focus information 28 corresponding to each of the screens 20a to 20d, arising from the movement of a presenter. FIG. 13 is a view showing the screens 20 and the position of a presenter in the conference room 12a. The screens shown in FIG. 13 correspond to the screens 20a to 20d of the local conference terminal 14a, which are arranged in this order from left to right in the drawing.

At the beginning of the presentation, because none of the screens are displayed, the values of the priority information 26 of all the screen IDs 22 are "nil". When the presenter begins the presentation, the image information is displayed on the screens 20b and 20c. At this point, the presenter stands between the screen 20b and the screen 20c and turns his/her body toward the screen 20b. Consequently, the action detection section 48 detects "action screen=screen ID 22b" and "action type=orientation of body". Further, because the image information is also displayed on the screen 20c, the action detection section 48 also detects "action screen=screen ID 22c" and "action type=screen display". The information concerning the action screens and the action types as described above is then transmitted to the focus determination processing section 52 and the priority determining section 54.

Upon receiving the information concerning the action screens and the action types, the priority determining section 54 sets the value of the priority information 26 corresponding to the screen ID 22b to "1" and sets the value of the event type 25 corresponding to the screen ID 22b to "orientation of body", because the action type with regard to the screen ID 22b is "orientation of body". On the other hand, because the action type with regard to the screen ID 22c is "screen display", the priority determining section 54 sets the value of the priority information 26 corresponding to the screen ID 22c to "2" and sets the value of the event type 25 corresponding to the screen ID 22c to "screen display". Here, because no image is displayed on the screens 20a and 20d, the values of the priority information 26 corresponding to the screen IDs 22a and 22d remain the initial value "nil" (see the flowchart in FIG. 8).

Further, because the action type with regard to the screen ID 22b is "orientation of body" the focus determination processing section 52 sets the value of the focus information 28 corresponding to the screen ID 22b to "1", and sets the values of the focus information 28 corresponding to screen IDs 22 other than the screen ID 22b to "0" (see step S800 in FIG. 13).

Now, the presenter turns toward the screen 20c and points to a portion of the screen 20c in order to provide explanation using the image information displayed on the screen 20c. The action detection section 48 detects "action screen=screen ID 22c" and "action type=pointing". Then, the information concerning the action screen and the action type as described above is transmitted to the focus determination processing section 52 and the priority determining section 54.

Upon receiving the information concerning the action screen and the action type, the priority determining section 54 sets the value of the priority information 26 corresponding to the screen ID 22c to "1" and sets the value of the event type 25 corresponding to the screen ID 22c to "pointing", because the action type with regard to the screen ID 22c is "pointing". Further, the focus determination processing section 52 sets the value of the focus information 28 corresponding to the screen ID 22c to "1", and sets the values of the focus information 28 corresponding to screen IDs 22 other than the screen ID 22c to "0" (see step S801 in FIG. 13).

Then, the first priority decrease time Δt1 has elapsed with the presenter continuously turned toward the screen 20c. The priority determining section 54 changes the value of the priority information 26 corresponding to the screen ID 22b to "2". Because the screen 20 on which the presenter takes action remains unchanged, the action screen detected by the action detection section 48 remains the same. Therefore, the focus determination processing section 52 does not update the values of the focus information 28 corresponding to the screen IDs 22a to 22d (see step S802 in FIG. 13).

Now, the image information is displayed on the screen 20d while the presenter remains turned toward the screen 20c. At this time, the action detection section 48 detects "action screen=screen ID 22d" and "action type=screen display", and transmits the information concerning the action screen and the action type as described above to the focus determination processing section 52 and the priority determining section 54.

Upon receiving the information concerning the action screen and the action type, the priority determining section 54 updates the value of the priority information 26 corresponding to the screen ID 22d to "2" and updates the value of the event type 25 corresponding to the screen ID 22d to "screen display", because the action type with regard to the screen ID 22d which is the action screen is "screen display". When the notice of "screen display" is received, the focus determination processing section 52 does not update the value of the focus information 28 corresponding to each screen ID (see step S803 in FIG. 13).

If a further time period of Δt2 has elapsed since the value of the priority information 26 of the screen 20b has been updated to "2", the priority determining section 54 updates the value of the priority information 26 corresponding to the screen ID 22b to "3". Because the screen 20 on which the presenter takes action remains unchanged, the action screen detected by the action detection section 48 remains the same. Therefore, the focus determination processing section 52 does not update the values of the focus information 28 corresponding to the screen IDs 22 (see step S804 in FIG. 13).

Then, the presenter turns toward the screen 20d and writes on the screen 20d. The action detection section 48 detects "action screen=screen ID 22d" and "action type=write". Upon receiving the information concerning the action screen and the action type as described above, the priority determining section 54 updates the value of the priority information 26 corresponding to the screen ID 22d to "1", because the action type with regard to the screen ID 22d which is the action screen is "write". Further, the focus determination processing section 52 updates the value of the focus information 28 corresponding to the screen ID 22d to "1", and updates the values of the focus information 28 corresponding to screen IDs 22 other than the screen ID 22d to "0" (see step S805 in FIG. 13).

Now, the image is displayed on the screen 20a while the presenter remains turned toward the screen 20d. The action detection section 48 detects "action screen=screen ID 22a" and "action type=screen display," and transmits the information concerning the action screen and the action type as described above to the focus determination processing section 52 and the priority determining section 54.

Upon receiving the information concerning the action screen and the action type, the priority determining section 54 updates the value of the priority information 26 corresponding to the screen ID 22a to "2" and updates the value of the event type 25 corresponding to the screen ID 22a to "screen display", because the action type with regard to the screen ID 22a which is the action screen is "screen display". Upon receiving the notice of "screen display", the focus determination processing section 52 does not update the value of the focus information 28 corresponding to each screen ID (see step S806 in FIG. 13).

Now, a time period of (Δt1+Δt2) has elapsed from when the presenter started explaining by using the screen 20d; i.e., from the time when the presenter takes no action on the screen 20c. The priority determining section 54 changes the value of the priority information 26 corresponding to the screen ID 22c to "3". Further, the priority determining section 54 updates the value of the priority information 26 corresponding to the screen ID 22a to "3" at a time point when a time period of Δt2 has elapsed since the image was displayed on the screen 20a. Because the screen 20 on which the presenter takes action remains unchanged, the action screen detected by the action detection section 48 remains the same. Therefore, the focus determination processing section 52 does not update the values of the focus information 28 corresponding to the screen IDs 22 (see step S807 in FIG. 13).

Now, the presenter performs presentation by using the screen 20a. The action detection section 48 detects "action screen=screen ID 22a" and "action type=orientation of body", and transmits the information concerning the action screen and the action type as described above to the focus determination processing section 52 and the priority determining section 54.

Upon receiving the information concerning the action screen and the action type as described above, the priority determining section 54 sets the value of the priority information 26 corresponding to the screen ID 22a to "1" and sets the value of the event type 25 corresponding to the screen ID 22a to "orientation of body", because the action type with regard to the screen ID 22c is "orientation of body". Further, the focus determination processing section 52 changes the value of the focus information 28 corresponding to the screen ID 22a to "1", and sets the values of the focus information 28 corresponding to screen IDs 22 other than the screen ID 22a to "0" (see step S808 in FIG. 13).

Then, the presenter performs presentation by using the screen 20c. Further, at substantially the same time, the displayed content of the screen 20d is changed. The action detection section 48 detects "action screen=screen ID 22c" and "action type=orientation of body". Also, as the image is displayed on the screen 22d, the action detection section 48 detects "action screen=screen ID 22d" and "action type=screen display". The information concerning the action screen and the action type is then transmitted to the focus determination processing section 52 and the priority determining section 54.

Upon receiving the information concerning the action screen and the action type as described above, the priority determining section 54 sets the value of the priority information 26 corresponding to the screen ID 22c to "1" and sets the value of the event type 25 corresponding to the screen ID 22c to "orientation of body", because the action type with regard to the screen ID 22c is "orientation of body". On the other hand, because the action type with regard to the screen ID 22d is "screen display", the priority determining section 54 sets the value of the priority information 26 corresponding to the screen ID 22d to "2". The focus determination processing section 52 changes the value of the focus information 28 corresponding to the screen ID 22c to "1", and sets the values of the focus information 28 corresponding to screen IDs 22 other than the screen ID 22c to "0" (see step S809 in FIG. 13).

Figure 14:
FIG. 14 is a view showing image information displayed on a screen of the remote conference terminal and the display mode of the screen.

Referring now to FIG. 14, the image information displayed on the screens of the remote conference terminal 14b and the display mode in each screen will be described. FIG. 14 shows the image information displayed on the screens of the remote conference terminal 14b and the display mode on the screens in a case where the presentation is performed in the local conference room 12a in a manner shown in FIG. 13. For describing the screen display process in the remote conference terminal 14b, the screen display process step for the remote conference terminal 14b corresponding to the transmission information generating process step of the local conference terminal 14a is designated by the same reference numeral with "A". Further, in the remote conference terminal 14b, the screen 30b is preset as a main screen.

The screen allocation processing section 64 receives the transmission information 18 including "screen IDs 22a, 22b, 22c, 22d" as the screen IDs 22, values of "0, 0, 1, 0" as values of the screen roles 23, values of "nil, 1, 2, nil" as values of the priority information 26, and values of "0, 0, 1, 0" as values of the focus information 28.

The screen allocation processing section 64 sequentially selects a number of the transmission information items 18 having a smaller value of the priority information (i.e., higher priority), corresponding to the number of screens (=2) of the remote conference terminal 14b (i.e. the screen allocation processing section selects the same number of transmission information items as the number of screens (=2) of the remote conference terminal 14b). Here, of the transmission information items 18, the values of the priority information 26 of the transmission information items 18b and 18c specified by the screen IDs 22b and 22c are smaller than those of the transmission information items 18a and 18d. Consequently, the screen allocation processing section 64 selects the transmission information items corresponding to the screen ID 22b and the screen ID 22c.

The value of the screen role 23 in the transmission information item 18c specified by the screen ID 22c is "1" (indicating a main screen). On the other hand, the screen 30b of the remote conference terminal 14b is a main screen. Accordingly, the screen ID 22c is allocated to the remote screen ID 32b corresponding to the screen 30b of the remote conference terminal 14b. Further, the screen ID 22b is allocated to the remote screen ID 32a corresponding to the other screen 30a of the remote conference terminal 14b. Then, the image information 24 included in the transmission information items 18 corresponding to the allocated screen IDs is displayed on the screens 30a and 30b, respectively.

Further, because the value of the focus information 28b of the transmission information item 18b specified by the screen ID 22b is "1", the image information item 24b is displayed on the screen 30a corresponding to the screen ID 22b in a mode different from that of the other screens (step S800A in FIG. 14).

The display control processing section 62 then receives the transmission information 18 in which the value of the focus information 28b of the transmission information item 18b specified by the screen ID 22b is changed to "0", and both the value of the priority information 26c and the value of the focus information 28c of the transmission information item 18c specified by the screen ID 22c are changed to "1". In this case, as the value of the screen role of the transmission information item 18c is "1" and the value of the priority information 26c of the transmission information item 18c is smaller than 3 (i.e. high priority), the screen allocation processing section 64 does not update the screen ID 22 corresponding to the screen 30b of the remote conference terminal 14b (see steps S83 and S84 in FIG. 12). Further, because the value of the focus information 28b of the transmission information item 18b specified by the screen ID 22b is "0", the image information 24b is displayed in a normal display mode on the screen 30a to which the screen ID 22b is allocated. On the other hand, because the value of the focus information 28c of the transmission information item 18c specified by the screen ID 22c is "1", the image information 24c is displayed in a display mode different from that of the other screens on the screen 30b to which the screen ID 22c is allocated (see step S801A in FIG. 14).

The display control processing section 62 then receives the transmission information 18 in which the value of the priority information 26 of the transmission information item 18b specified by the screen ID 22b is changed to "2". In this case, because the value of the priority information 26 of the transmission information item 18b is "2" and the values of the priority information 26 of the transmission information items 18a and 18d specified by the screen IDs 22a and 22d, respectively, are both "nil", the screen ID 22b remains allocated to the screen 30a of the remote conference terminal 14b (see step S802A in FIG. 14).

The display control processing section 62 then receives the transmission information 18 in which the value of the priority information 26 of the transmission information item 18d specified by the screen ID 22d is changed to "2". In this case, the values of the priority information 26 of the transmission information items 18b and 18d specified by the screen ID 22b and the screen ID 22d, respectively, are both "2" and are therefore the same. When the values of the priority information 26 are the same, a higher rank order is placed to the transmission information item in which the value of the event receipt time 27 is the greater. In this case, because the value of the event receipt time 27d of the transmission information item 18d is greater than the value of the event receipt time 27b of the transmission information item 18b, the screen ID 22d is allocated to the screen 30a of the remote conference terminal 14b (see step S803A in FIG. 14).

The display control processing section 62 then receives the transmission information 18 in which the value of the priority information 26 of the transmission information item 18b specified by the screen ID 22b is changed to "3". In this case, because the value of the priority information 26 of the transmission information item 18d specified by the screen ID 22d is smaller (i.e. higher priority) than the value of the priority information 26 of the transmission information item 18b, the screen ID 22d is allocated to the screen 30a of the remote conference terminal 14b (see step S804A in FIG. 14).

The display control processing section 62 then receives the transmission information 18 in which the value of the focus information 28c of the transmission information item 18c specified by the screen ID 22c is changed to "0", and both the value of the priority information 26d and the value of the focus information 28d of the transmission information item 18d specified by the screen ID 22d are changed to "1". In this case, as the value of the priority information 26d of the transmission information item 18d is "1", the display control processing section 62 allocates the screen ID 22d to the screen 30a of the remote conference terminal 14b. Further, because the value of the focus information 28d of the transmission information item 18d is "1", the image information 24d is displayed on the screen 30a in a display mode different from that of the other screens 30 (see step S805A in FIG. 14).

The display control processing section 62 then receives the transmission information 18 in which the value of the priority information 26 of the transmission information item 18a specified by the screen ID 22a is changed to "2". In this case, because the value of the priority information 26 of the transmission information 18a is greater (i.e. lower priority) than the values of the priority information 26 of the transmission information items 18c and 18d specified by the screen IDs 22c and 22d, respectively, the image information corresponding to the screen ID 22a is not displayed in the remote conference terminal 14b (see step S806A in FIG. 14).

The display control processing section 62 then receives the transmission information 18 in which the value of the priority information 26 of the transmission information item 18a specified by the screen ID 22a is changed to "3" and the value of the priority information 26 of the transmission information item 18c specified by the screen ID 22c is changed to "3". Consequently, the values of the priority information 26 corresponding to the transmission information items 18a, 18b, and 18c specified by the screen ID 22a, the screen ID 22b, and the screen ID 22c, respectively, are all "3" and are therefore the same. Accordingly, the values of the event receipt time corresponding to the respective screen IDs 22a to 22c are compared. As a result, because the value of the event receipt time 27c of the transmission information item 18c is the greatest, the screen ID 22c is allocated to the screen 30b of the remote conference terminal 14b (see step S807A in FIG. 14).

The display control processing section 62 then receives the transmission information 18 in which the values of the focus information 28 and the priority information 26 of the transmission information item 18a specified by the screen ID 22a are changed to "1" and the value of the focus information 28 of the transmission information item 18d specified by the screen ID 22d is changed to "0". Because the values of the priority information 26 of the transmission information items 18a and 18d are smaller (i.e. higher priority) than the values of the priority information 26 corresponding to other screen IDs 22, the screen ID 22a and the screen ID 22d of the transmission information items 18a and 18d, respectively, are allocated to the screens 30 of the remote conference terminal 14b. At this time, the image information corresponding to the screen ID 22d, which is already displayed on the screen 30a of the remote conference terminal 14b, remains displayed on the screen 30a. Further, because the value of the focus information 28 corresponding to the screen ID 22a is "1", the image information is displayed on the screen 30b corresponding to the screen ID 22a in a display mode different from that of the other screens (see step S808A in FIG. 14).

The display control processing section 62 then receives the transmission information 18 in which the value of the focus information 28 of the transmission information item 18a specified by the screen ID 22a is changed to "0" and the values of the focus information 28 and the priority information 26 of the transmission information item 18c specified by the screen ID 22c are both changed to "1". The display control processing section 62 selects, among the transmission information items 18a to 18d, the transmission information items 18a and 18c in which the values of the priority information are smaller (i.e. higher priority). Because the screen role of the transmission information item 18c is "1", the screen ID 22c which specifies the transmission information item 18c is allocated to the screen 30b which is a main screen of the remote conference terminal 14b (see step S809A in FIG. 14).

As described above, the transmission information 18 including the priority information 26, the focus information 28, the event type 25, the event receipt time 27, and the image information 24 for each screen ID 22 is transmitted from the local conference terminal 14a to the remote conference terminal 14b. Consequently, the information which is used as a criterion for determining whether or not the image information 24 included in the transmission information item 18 should be displayed on the screen of the remote conference terminal 14b can be obtained in the remote conference terminal 14b, so that the remote conference terminal 14b can select among the image information item 24 which is to be displayed on the screens 30 and the image information items 24 which are not to be displayed on the screen 30.

According to the present embodiment, the screen of the local conference terminal 14a is assumed to be a screen provided in the display device which is connected to the local conference terminal 14a, and the local conference terminal 14a is assumed to display a single item of the image information on a single screen of the display device. However, it is also possible to assume that the screen of the local conference terminal 14a in the present invention corresponds to each of display regions which are obtained by dividing the display region of a single display device into plural regions.

Further, if the number of screens of the remote conference terminal 14b is greater than the number of screens of the local conference terminal 14a, the image information of high priority may be displayed on the screens to which no screens are allocated or no images may be displayed on these screens. Alternatively, a list of image information items which can be displayed may be displayed on the screens of the remote conference terminal 14b which are not subjected to screen allocation.

Further, in the present embodiment, each of the first priority decrease time $\Delta t1$ and the second priority decrease time $\Delta t2$ is set to a common time period for all the screen IDs 22a to 22d. However, because the process for decreasing the priority (i.e. for increasing the value of the priority information) is performed for each screen ID 22, each of the first priority decrease time $\Delta t1$ and the second priority decrease time $\Delta t2$ may be set to a different time period for each screen ID 22. For example, with regard to the screen ID 22c of the main screen, if the first priority decrease time $\Delta t1$ is increased, the time period in which the value of the priority information 26 corresponding to the screen ID 22c is "1" can be extended. Consequently, it is possible to increase the possibility that the image information 24 displayed on the main screen appears on the screen 30 of the remote conference terminal 14b.

While the preferred embodiment of the present invention has been described by use of specific terms, such description is for illustrative purposes only, and it is to be understood that changes and modifications may be made without departing from the spirit or scope of the appended claims.

According to one aspect of the present invention, there may be provided an action detection part which detects an action of the speaker, wherein the priority allocation part allocates the priority to the image information items based on the detected action.

According to another aspect of the present invention, there may be provided an image capturing part which captures an image of the speaker, wherein the action detection part detect the action of the speaker based on the captured image.

According to a further aspect of the present invention, there may be provided an image information specifying part which specifies an image information item which is being used by the speaker for explanation based on the action detected by the action detection part, wherein the information transmission processing part transmits to the remote conference terminal apparatus information of the image information item which is being used by the speaker.

According to a further aspect of the present invention, there may be provided a transmission information generating part which generates transmission information including the displayed image information items, the priority information, and the focus information, wherein the information transmission processing part transmits to the remote conference terminal apparatus the generated transmission information.

According to a further aspect of the present invention, there may be provided the information reception processing part receives focus information indicating which of the image information items is being used by the speaker for explanation, and the display processing part displays the image information item being used by the speaker in a mode different from that of other image information item.

According to a further aspect of the present invention, there may be provided detecting an action of a speaker of the electronic conference, and allocating the priority to the image information items based on the detected action.

According to a further aspect of the present invention, there may be provided capturing an image of the speaker, and detecting the action of the speaker based on the captured image.

According to a further aspect of the present invention, there may be provided specifying an image information item which is being used by the speaker for explanation based on the detected action, and transmitting to the remote conference terminal apparatus information of the image information item which is being used by the speaker.

According to a further aspect of the present invention, there may be provided receiving focus information indicating which of the image information items is being used by the speaker for explanation, and displaying the image information item being used by the speaker in a mode different from that of other image information item.

The disclosure of Japanese Patent Application No. 2005-185090 including the specification, claims, drawings, and abstract, is incorporated herein by reference in its entirety.

What is claimed is:

1. An electronic conference system comprising:
a first conference terminal apparatus used by a speaker of an electronic conference for transmitting image information displayed on a number of first screens and causing a second conference terminal apparatus used by an audience to display the image information on a number of second screens, the number of first screens being different from the number of second screens;
said first conference terminal apparatus including,
a screen control part displaying a plurality of image information items simultaneously on the number of first screens,
a priority allocation part assigning to each of the displayed image information items priority for being displayed on the number of second screens, and
an information transmission processing part transmitting to said second conference terminal apparatus the displayed image information items, screen identification information for each displayed image information item, and the priority allocated to each displayed image information items; said second conference terminal apparatus including,
an information reception processing part receiving, from said first conference terminal apparatus, a plurality of image information items, screen identification information for each image information item to be displayed, and priority information for each image information item to be displayed, a number of received image information items being greater than the number of second screens used for displaying the image information items, and
a display processing part extracting, from the received plurality of image information items, a number of image information items equal to the number of second screens used for displaying the image information items, the extracted image information items having a highest priority of the received plurality of image information items;
said display processing part causing the extracted image information items to be displayed simultaneously on the second screens.

2. The electronic conference system according to claim 1, wherein said first conference terminal apparatus further comprises:
an action detection part detecting an action of the speaker, wherein the priority allocation part allocates the priority to the image information items based on the detected action.

3. The electronic conference system according to claim 2, wherein said first conference terminal apparatus further comprises:
an image capturing part capturing an image of the speaker; wherein said action detection part detects the action of the speaker based on the captured image.

4. The electronic conference system according to claim 2, wherein said first conference terminal apparatus further comprises:
an image information specifying part specifying an image information item being used by the speaker for explanation based on the action detected by the action detection part, wherein the information transmission processing part transmits to said second conference terminal apparatus information of the image information item being used by the speaker.

5. The electronic conference system according to claim 4, wherein said information transmission processing part of said first conference terminal apparatus transmitting focus information for each displayed image information item to said second conference terminal apparatus the generated transmission information.

6. An electronic conference system comprising:
a local conference terminal apparatus used by an audience of an electronic conference for displaying image information, on a number of local screens, transmitted from a remote conference terminal apparatus used by a speaker and displaying the transmitted image information on a number of remote screens, the number of local screens being different from the number of remote screens;
said local conference terminal apparatus including,
an information reception processing part receiving, from the remote conference terminal apparatus, a plurality of image information items, screen identification information for each image information item to be displayed, and priority information for each image information item to be displayed, a number of received image information items being greater than the number of local screens used for displaying the image information items, and
a display processing part extracting, from the received plurality of image information items, a number of image information items equal to the number of local screens used for displaying the image information items, the extracted image information items having a highest priority of the received plurality of image information items;

said display processing part causing the extracted image information items to be displayed simultaneously on the local screens.

7. The electronic conference system according to claim 6, wherein the information reception processing part receives focus information indicating which image information items is being used by the speaker for explanation, and the display processing part displays the image information item being used by the speaker in a mode different from other image information items.

8. An electronic conference system comprising:
- a transmitting terminal apparatus displaying a plurality of image information items simultaneously on a number of local screens, allocating to each of the displayed image information items priority for being displayed on a number of remote screens, and transmitting to a remote conference terminal apparatus the displayed image information items, screen identification information for each image information item, and the priority allocated to each of the image information items, the number of local screens being different from the number of remote screens; and
- a remote terminal apparatus receiving, from said transmitting terminal apparatus, a plurality of image information items, screen identification information, and priority information for displaying the received image information items, a number of received image information items being greater than the number of remote screens used for displaying the image information items, extracting, from the received plurality of image information items, a number of image information items equal to the number of remote screens used for displaying the image information items, the extracted image information items having a highest priority of the received plurality of image information items, and displaying the extracted image information items simultaneously on the remote screens.

9. A method of transmitting and displaying image information items used in an electronic conference, comprising:
- allocating to each of a plurality of image information items, being displayed simultaneously on a number of local screens, priority for being displayed on a number of remote screens, the number of local screens being different from the number of remote screens;
- transmitting, to a remote conference terminal apparatus, the displayed image information items, screen identification information for each displayed image information item, and priority information allocated to each of the displayed image information items;
- receiving the transmitted displayed image information items, screen identification information, and priority information, a number of received image information items being greater than the number of remote screens used for displaying the image information items;
- extracting, from the received displayed image information items, a number of image information items equal to the number of remote screens used for displaying the image information items, the extracted image information items having a highest priority of the received displayed image information items; and
- displaying the extracted image information items simultaneously on the remote screens.

10. The method according to claim 9, further comprising:
detecting an action of a speaker of the electronic conference, and allocating the priority to the image information items based on the detected action.

11. The method according to claim 10, further comprising:
capturing an image of the speaker; and
detecting the action of the speaker based on the captured image.

12. The method according to claim 10, further comprising:
specifying an image information item being used by the speaker for explanation based on the detected action; and
transmitting to the remote conference terminal apparatus information of the image information item being used by the speaker.

* * * * *